United States Patent
Nakagawa et al.

(10) Patent No.: US 6,168,519 B1
(45) Date of Patent: Jan. 2, 2001

(54) IMAGE DISPLAY GAME SYSTEM, IMAGE DISPLAY METHOD FOR SAME, AND STORAGE MEDIUM STORING IMAGE DISPLAY PROGRAM FOR SAME

(75) Inventors: Eiji Nakagawa, Kakogawa; Yasuo Okuda, Moriguchi, both of (JP)

(73) Assignee: Konami Co., Ltd. (JP)

( * ) Notice: Under 35 U.S.C. 154(b), the term of this patent shall be extended for 0 days.

(21) Appl. No.: 09/323,617

(22) Filed: Jun. 1, 1999

(30) Foreign Application Priority Data

Jun. 3, 1998  (JP) .................................................. 10-169177

(51) Int. Cl.⁷ ........................................................ A63F 9/24
(52) U.S. Cl. ......................................... 463/4; 463/1; 463/2
(58) Field of Search .................................. 463/1, 2, 3, 4, 463/7, 23

(56) References Cited

U.S. PATENT DOCUMENTS

| | | | |
|---|---|---|---|
| 4,504,055 | * 3/1985 | Wells ................................. | 273/85 G |
| 4,858,930 | * 8/1989 | Sato ................................... | 273/85 G |
| 5,462,275 | * 10/1995 | Lowe et al. ............................ | 273/94 |
| 5,618,179 | * 4/1997 | Copperman et al. ................... | 434/69 |

OTHER PUBLICATIONS

O Trulsen, A Rundberg: "Championship Manager Season 97/98" "ONLINE!, Nov. 1997 (1997–11), pp. 1–10, XP002116024 Retrieved from the Internet: <URL:http://www.gamesdomain.com/gdreview/zones/reviews/pc/nov97/cm9798.html>" retrieved on 1999–09–17!.*

Foster, Hugo. GameSpot. "FIFA: Road to the World Cup 98." [Online]. Jan. 13, 1998. [retrieved on Feb. 28, 2000]. Retrieved from Internet:<URL:http://www.gamespot.com/sports/fifa98/printable_review.html>.*

* cited by examiner

Primary Examiner—Michael O'Neill
Assistant Examiner—Julie Kasick
(74) Attorney, Agent, or Firm—Lerner, David, Littenberg, Krumholz & Mentlik, LLP

(57) ABSTRACT

In a game system, an atmosphere, such as a temperature and a humidity, is set to a field where player characters compete with each other. The atmosphere Is displayed on a display screen. While a game advances, an ability value of each player character is changed depending on the atmosphere, and a change in ability value is displayed on the display screen. Since the ability of each player character is determined according to the ability value, the ability of each player character is changed as the game advances so that the development of the game is also changed. Accordingly, based on the displayed atmosphere, a game player can elaborate a strategy so that attractiveness of the game is enhanced.

42 Claims, 23 Drawing Sheets

IMAGE DISPLAY GAME SYSTEM, IMAGE
DISPLAY METHOD FOR SAME, AND
STORAGE MEDIUM STORING IMAGE
DISPLAY PROGRAM FOR SAME

BACKGROUND OF THE INVENTION

1. Field of the Invention

The present invention relates to an image display game system, an image display method for the system, and a storage medium storing an image display program for the system.

2. Description of the Related Art

There have been proposed a number of video game systems, such as a system composed of a home-use dedicated game device and a television monitor, a business-use dedicated game machine, and a system composed of a personal computer or a work station, a display device and a sound output device. Each of those systems comprises a controller operated by a game player, a storage medium storing game program data, a CPU performing a control for producing sounds and images based oil the game program data, a processor for producing images, a processor for producing sounds, a CRT for displaying images, and a speaker for outputting sounds. As the foregoing storage medium, a CD-ROM, a semiconductor memory, a cassette incorporating a semiconductor memory, or the like may be used.

There are various kinds of games. Among them, soccer games, for example, are known wherein a number of player characters appear on a soccer field and compete with each other. In the soccer game, a game player operates a controller to give commands for dribbling, passing, shooting and so forth to player characters of a team on the side of the game player to get scores so as to finally decide a winner team of the game.

In some of the soccer games, inherent values representing abilities, such as running ability, passing ability, kicking ability, shooting ability and dribbling ability, are assigned to each of player characters so that a game player can decide positions of the player characters depending on the abilities thereof and advance the game according to a strategy of the game player.

However, even if the player characters are assigned their inherent ability values, how to use those player characters may be determined simply by the assigned ability values so that the strategy may be very limited. For example, for winning the game, it is always better to use those player characters having the greater ability values. As a result, it is considered that attractiveness of the game is lowered as the game player gets used to playing the game.

SUMMARY OF THE INVENTION

Therefore, it is an object of the present invention to provide an image display game system which can avoid lowering of attractiveness of a game even if a game player gets used to playing it.

It is another object of the present invention to provide an image display method which, like the image display game system, can avoid lowering of attractiveness of a game even if a game player gets used to playing it.

It is another object of the present invention to provide a storage medium storing a program which, when executed, realizes the foregoing image display game system or the foregoing image display method.

According to one aspect of the present invention, there is provided an image display game system comprising an operation input section, an arithmetic section and an image display section, wherein a plurality of player characters each assigned an ability value compete with each other on a field based on an operation inputted by a game player via the operation input section and a given algorithm so as to decide a winner of a game, each of the player characters influenced by the corresponding ability value and wherein progress of the game is displayed via the image display section, and wherein the arithmetic section comprises an atmosphere setting section which sets an atmosphere of the field; an atmosphere display arithmetic section which displays, via the image display section, an image of the atmosphere set by the atmosphere setting section; and an ability value changing section which changes each of the ability values according to the atmosphere set by the atmosphere setting section.

It may be arranged that the ability value changing section changes each of the ability values in a manner which corresponds to the atmosphere.

It may be arranged that the arithmetic section further comprises a field setting section which sets as the field one of a plurality of fields, and that the atmosphere setting section sets the atmosphere corresponding to the field set by the field setting section.

It may be arranged that the field setting section sets a place and a time as the set field.

It may be arranged that the atmosphere display arithmetic section displays the atmosphere in the form of weather of the field via the image display section.

It may be arranged that the atmosphere setting section sets the atmosphere by setting a value of an atmosphere parameter.

It may be arranged that each of the ability values comprises a stamina value representing stamina of the corresponding player character, and that the ability value changing section reduces each of the stamina values at a speed which changes according to the value of the atmosphere parameter.

It may be arranged that the atmosphere parameter comprises a temperature parameter, and that the atmosphere display arithmetic section displays the atmosphere in the form of a temperature of the field.

It may be arranged that the ability value changing section reduces each of the stamina values more rapidly as the temperature represented by the temperature parameter increases.

It may be arranged that the atmosphere parameter comprises a humidity parameter, and that the atmosphere display arithmetic section displays the atmosphere in the form of a humidity of the field.

It may be arranged that the ability value changing section reduces each of the stamina values more rapidly as the humidity represented by the humidity parameter increases.

It may be arranged that when any of the stamina values becomes no greater than a given value, the arithmetic section largely lowers an ability of the corresponding player character.

It may be arranged that the arithmetic section divides the player characters into a plurality of teams and calculates a game between the teams to decide a winner team of the game.

According to another aspect of the present invention, there is provided, in an image display game system comprising an operation input section, an arithmetic section and an image display section, wherein a plurality of player characters each assigned an ability value compete with each other on a field based on an operation inputted by a game player via the operation input section and a given algorithm so as to decide a winner of a game, each of the player characters influenced by the corresponding ability value and wherein progress of the game is displayed via the image display section, an image display method comprising the steps, as functions of the arithmetic section, of setting an atmosphere of the field; causing the image display section to display an image of the atmosphere; changing each of the ability values according to the atmosphere; and causing the image display section to display the progress of the game achieved by the player characters whose ability values have been changed.

According to another aspect of the present invention, there is provided a storage medium storing a program which is executable by an arithmetic section of an image display game system having an operation input section and an image display section, the program allowing the arithmetic section to operate such that a plurality of player characters each assigned an ability value compete with each other on a field based on an operation inputted by a game player via the operation input section and a given algorithm so as to decide a winner of a game, each of the player characters influenced by the corresponding ability value and such that progress of the game is displayed via the image display section, the program further allowing the arithmetic section to execute the steps of setting an atmosphere of the field; changing each of the ability values according to the atmosphere; and causing the image display section to display an image of the atmosphere.

It may be arranged that each of the ability values is changed in a manner which corresponds to the atmosphere.

It may be arranged that one of a plurality of fields is set as the field, and that the atmosphere is set so as to correspond to the set field.

It may be arranged that a place and a time are set as the set field.

It may be arranged that the atmosphere is set in the form of weather of the field which is displayed via the image display section.

It may be arranged that the atmosphere is set by setting a value of an atmosphere parameter.

It may be arranged that each of the ability values comprises a stamina value representing stamina of the corresponding player character, and that each of the stamina values is reduced at a speed which changes according to the value of the atmosphere parameter.

It may be arranged that the atmosphere parameter comprises a temperature parameter, and that the atmosphere is displayed in the form of a temperature of the field.

It may be arranged that each of the stamina values is reduced more rapidly as the temperature represented by the temperature parameter increases.

It may be arranged that the atmosphere parameter comprises a humidity parameter, and that the atmosphere is displayed in the form of a humidity of the field.

It may be arranged that each of the stamina values is reduced more rapidly as the humidity represented by the humidity parameter increases.

It may be arranged that when any of the stamina values becomes no greater than a given value, an ability of the corresponding player character is largely lowered.

It may be arranged that the player characters are divided into a plurality of teams and a game between the teams is computed to decide a winner team of the game.

BRIEF DESCRIPTION OF THE DRAWINGS

The present invention will be understood more fully from the detailed description given hereinbelow, taken in conjunction with the accompanying drawings.

In the drawings:

FIGS. 14A to 14C show processes for setting commands by a CPU, wherein FIG. 14A is a flowchart representing a formation manager, FIG. 14B is a flowchart representing a team manager, and FIG. 14C is a flowchart representing a CPU manager;

DESCRIPTION OF THE PREFERRED EMBODIMENT

Now, a preferred embodiment of the present invention will be described hereinbelow with reference to the accompanying drawings.

Figure 1:
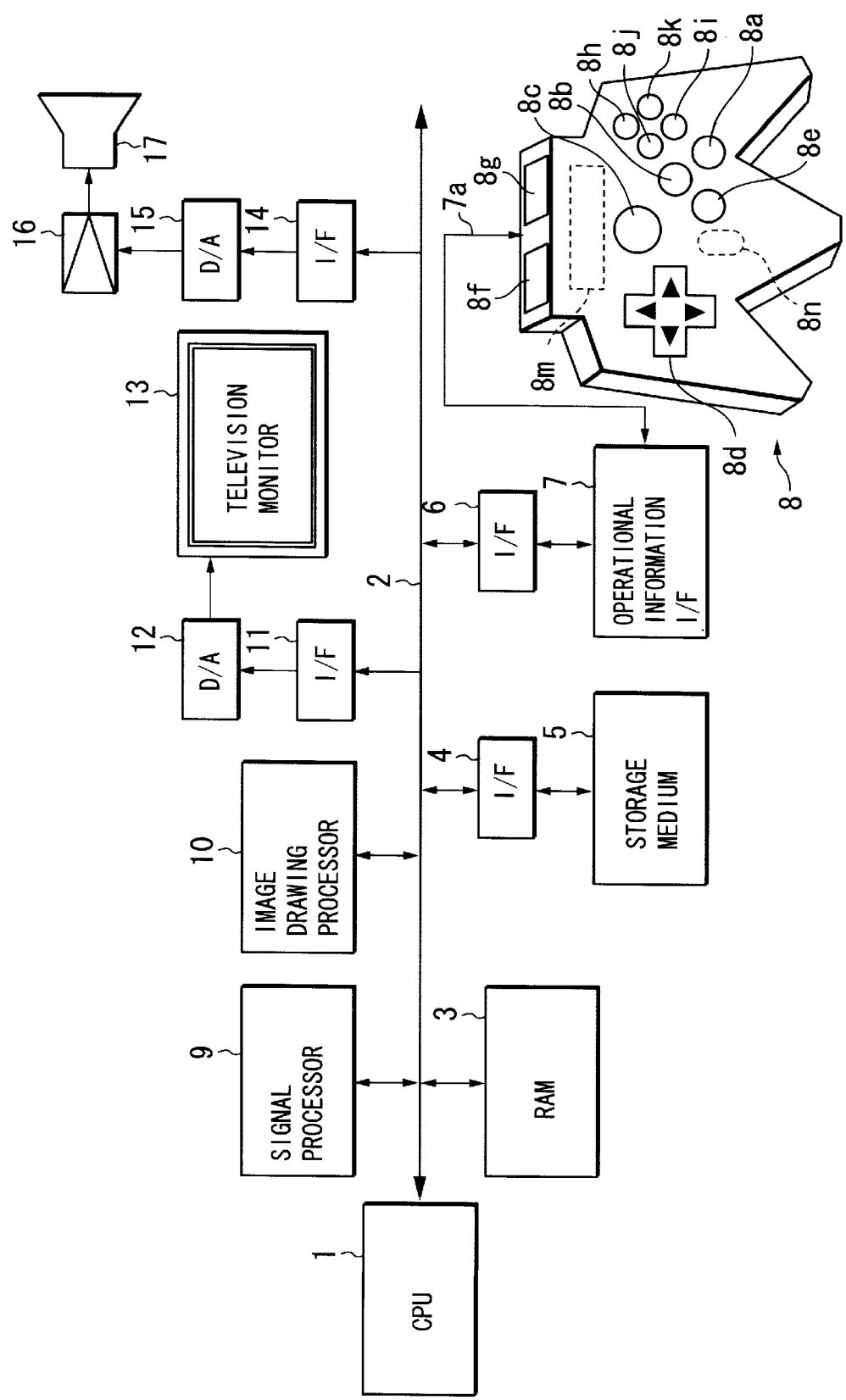
FIG. 1 is a block diagram showing the structure of a game system according to a preferred embodiment of the present invention.

FIG. 1 shows the structure of a game system according to the preferred embodiment of the present invention.

The game system shown in FIG. 1 comprises a basic game device, a television monitor 13 for displaying images of a game, a pre-main amplifier 16 and a speaker 17 for producing sounds of the game, and a storage medium 5 for storing game data including image data, sound data and program data. The storage medium 5 may be a so-called ROM cassette having a plastic case accommodating therein a ROM storing the game data and operating system program data, an optical disk, a flexible disk or the like. Naturally, the storage medium may also be of the type which is directly mounted on a game circuit board.

The basic game device comprises a CPU 1 to which a bus 2 is connected. The bus 2 comprises address, data and controller buses. To the bus 2 are connected a RAM 3, an interface circuit 4, an interface circuit 6, a signal processor 9, an image drawing processor 10, an interface circuit 11 and an interface circuit 14. A controller 8 is connected to the interface circuit 6 via an operational information interface circuit 7. A D-A converter 12 is connected to the interface circuit 11. A D-A converter 15 is connected to the interface circuit 14.

The game system may differ in configuration according to uses thereof. Specifically, when the game system is intended for home use, the television monitor 13, the pre-main amplifier 16 and the speaker 17 are arranged to be separate from the basic game device. On the other hand, when the game system is intended for business use, all the components of the game system shown in FIG. 1 are formed as one unit received in a casing. When the game system is constructed as a system using a personal computer or a work station, the television monitor 13 corresponds to a display for the computer, the image drawing processor 10 corresponds to part of the game program data stored in the storage medium 5 or to hardware on an expansion board mounted in an expansion slot of the computer, and the interface circuits 4, 6, 11 and 14, the D-A converters 12 and 15 and the operational information interface circuit 7 correspond to the hardware on the expansion board mounted in the expansion slot of the computer. The RAM 3 corresponds to an area in a main memory or an expansion memory of the computer. In this embodiment, it is assumed that the game system is intended for home use.

Now, the components of the game system shown in FIG. 1 will be described in more detail. The signal processor 9 mainly implements computation of viewing positions for setting the height, direction and zooming of a camera as will be described later, computation of three-dimensional coordinates of positions as viewed from the viewing position, and computation for conversion of the three-dimensional positions into positions in the pseudo-three-dimensional space. The signal processor 9 further implements light source computation, as well as generation and processing of sound data.

Based on the results of the foregoing computations carried out by the signal processor 9, the image drawing processor 10 performs processing such as writing into the RAM 3 of image data to be drawn, e.g. writing (pasting) of texture data into areas of the RAM 3 as designated in the form of polygons.

The controller 8 has an A button 8a, a B button 8b, a start button 8c, a cross key 8d, a stick-type controller 8e, a left trigger button 8f, a right trigger button 8g, a C1 button 8h, a C2 button 8i, a C3 button 8j, a C4 button 8k, a connector 8m and a depthwise (direction perpendicular to two-dimensional display) trigger button 8n. A memory or the like for temporarily storing the development of the game, for example, can be detachably connected to the connector 8m. The stick-type controller 8e is operable not only in four directions, i.e. upward, downward, leftward and rightward, but in all directions of 360 degrees, and thus has a function substantially the same as that of a joy stick. The C1 button 8h, the C2 button 8i, the C3 button 8j and the C4 button 8k will also be collectively referred to as "C buttons". The functions of the respective buttons will be explained when it becomes necessary.

Now, an operation of the game system will be described hereinbelow.

A power switch (not shown) is turned on, so that the game system is energized. Then, based on the operating system stored in the storage medium 5, the CPU 1 reads the image data, the sound data and the game program data from the storage medium 5. Part or whole of the read image, sound and game program data is held on the RAM 3. Thereafter, the CPU 1 advances the game according to the game program, the image data including polygons and textures of objects to be displayed and the sound data, as well as instructions given by a game player via the controller 8. Specifically, the CPU 1 produces commands as tasks for drawing images and outputting sounds according to the instructions given by the game player via the controller 8. Based on those commands, the signal processor 9 implements computation of the viewing position, computation of positions of characters in the three-dimensional space and the two-dimensional plane as viewed from the viewing position, and computation of light source, as well as generation and processing of sound data.

Subsequently, based on the results of the foregoing computations, the image drawing processor 10 performs processing such as writing of image data to be drawn into a display area of the RAM 3. The image data written into the display area of the RAM 3 is supplied to the D-A converter 12 via the interface circuit 11. The D-A converter 12 converts the image data into analog video signals which are then fed to the television monitor 13 so as to be displayed thereon as images. On the other hand, the sound data outputted from the signal processor 9 is supplied to the D-A converter 15 via the interface circuit 14. The D-A converter 15 converts the sound data into analog sound signals which are then fed to the speaker 17 via the pre-main amplifier 16 so as to be outputted therefrom as sounds.

There are two types of the image drawing commands, one for drawing a three-dimensional image using polygons, and the other for drawing an ordinary two-dimensional image, wherein the polygon represents an elementary two-dimensional image which has the shape of a triangle or a rectangle in this embodiment.

The image drawing command for drawing a three-dimensional image using polygons comprises polygon apex address data indicative of addresses in the RAM 3, texture address data indicative of storage positions in a buffer of texture data to be pasted to the polygons, color pallet address data indicative of storage positions on the RAM 3 of color pallet data indicative of the colors of the texture data, and luminance data indicative of luminance levels of the textures.

Among the foregoing data, the polygon apex address data is obtained through a coordinate conversion of polygon apex coordinate data in the three-dimensional space from the CPU 1 into polygon apex coordinate data on the two-dimensional plane. This coordinate conversion is carried out by the image drawing processor 10 according to data indicative of the amounts of scrolling and rotation of the display. The image drawing processor 10 writes corresponding texture data into a display area of the RAM 3 defined by address data of three or four polygon apexes, Each object is constituted of a number of polygons. The CPU 1 stores three-dimensional coordinate data of each polygon in the RAM 3. When moving a player character on a display screen through the operation of the controller 8, i.e. when expressing the motion of the player character itself or when changing the viewing position from which the game player views the player character, the following processing is carried out:

Specifically, based on the three-dimensional coordinate data of the apexes of the respective polygons held in the RAM 3 and the moving amount data and the rotation amount data of the respective polygons, the CPU 1 successively derives three-dimensional coordinate data of the respective polygons after the movement and rotation. Among the thus derived three-dimensional coordinate data of the polygons, the horizontal and vertical coordinate data are fed to the image drawing processor 10 as the address data indicative of the addresses in the display area of the RAM 3, i.e. as the polygon apex address data. The image drawing processor 10 writes texture data identified by texture address data allocated beforehand into a triangular or rectangular display area of the buffer identified by address data of three or four polygon apexes. Consequently, objects, such as player characters of both teams, judges, soccer field, goal net, stadium stand and audience, in the form of a number of polygons with texture data pasted thereto are displayed on the display screen of the monitor 13.

The image drawing command for drawing an ordinary two-dimensional image comprises apex address data, texture address data, color pallet address data indicative of the stored positions on the RAM 3 of color pallet data indicative of colors of the texture data, and luminance data indicative of the levels of luminance of the textures. Among those data, the apex address data is coordinate data obtained through a coordinate conversion of apex coordinate data on the two-dimensional plane from the CPU 1. This coordinate conversion is carried out by the image drawing processor 10 based on the moving amount data and the rotation amount data from the CPU 1. Hereinafter, the image drawing processing will be briefly stated like "issue an image drawing command".

The signal processor 9 stores the ADPCM data read from the storage medium 5 into the RAM 3. The ADPCM data stored in the RAM 3 is used as a sound source. The signal processor 9 reads out the ADPCM data using clocks of a frequency of, for example, 44.1 KHz. The signal processor 9 implements various kinds of processing on the ADPCM data read from the RAM 3, such as conversion of pitch, addition of noise, setting of envelope, setting of level and reverberation. When the sound data read from the storage medium 5 is PCM data such as CD-DA (Compact Disk Digital Audio), the data is converted into ADPCM data by the signal processor 9. The processing of the PCM data using the program data is directly carried out in the RAM 3. The PCM data processed in the RAM 3 is fed to the signal processor 9 so as to be converted into ADPCM data which is then subjected to the foregoing various kinds of processing and outputted from the speaker 16 as sounds.

The data stored in the storage medium 5 are read by a driver, for example, a hard disk drive, an optical disk drive, a flexible disk drive, a silicon disk drive or a cassette medium reading device. Thus, the storage medium 5 may be, for example, a hard disk, an optical disk, a flexible disk or a semiconductor memory. The driver reads the image data, the sound data and the program data from the storage medium 5, and feeds the read data to the interface circuit 4. The interface circuit 4 implements error correction processing on the reproduced data from the driver according to ECC (Error Correction Code), and feeds the error-corrected data to the RAM 3 or to the signal processor 9.

In the game system having the foregoing structure and operation, the controller 8 functions as an operation input section, the CPU 1, the RAM 3, the signal processor 9 and the image drawing processor 10 cooperatively function as an arithmetic section, and the television monitor 13 functions as an image display section. Further, when executing the program stored in the storage medium 5, the arithmetic section functions as an atmosphere setting section, an atmosphere display arithmetic section and an ability value changing section.

Now, the game system will be described in further detail as a soccer video game system.

Figure 2:
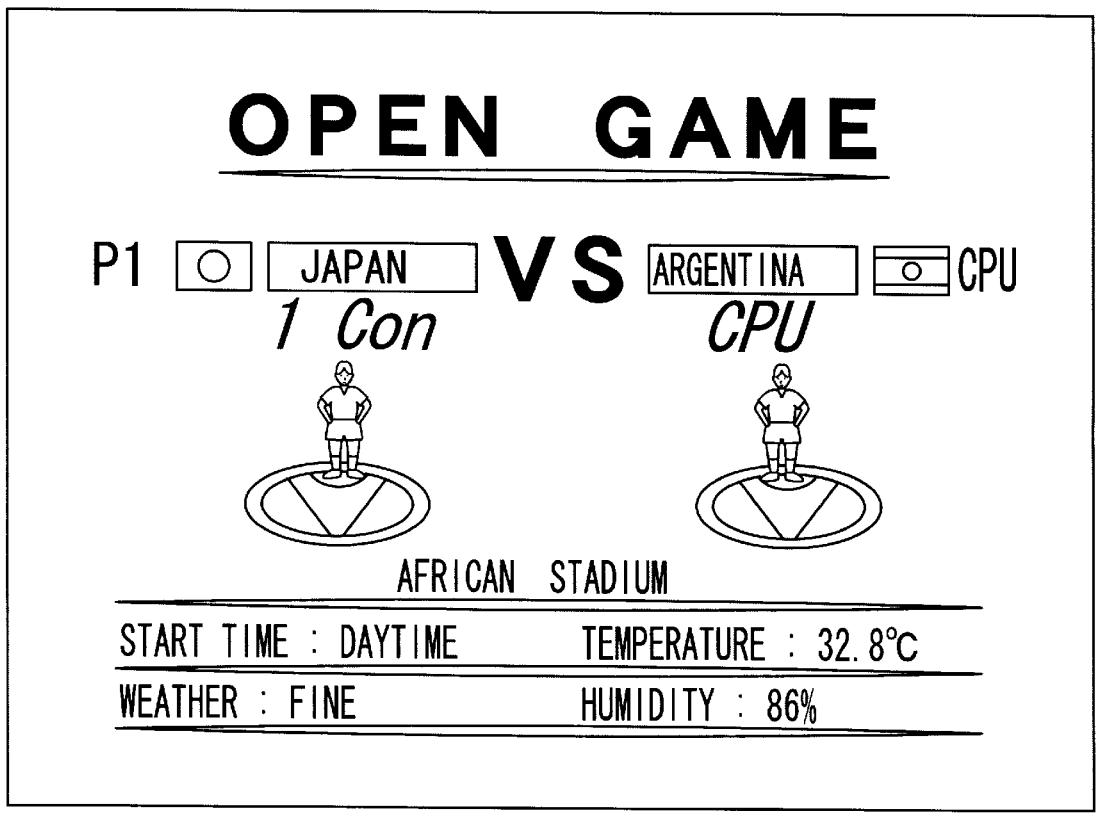
FIG. 2 is a diagram showing an image displaying a soccer field, an atmosphere thereof, and so forth.
Figure 4:
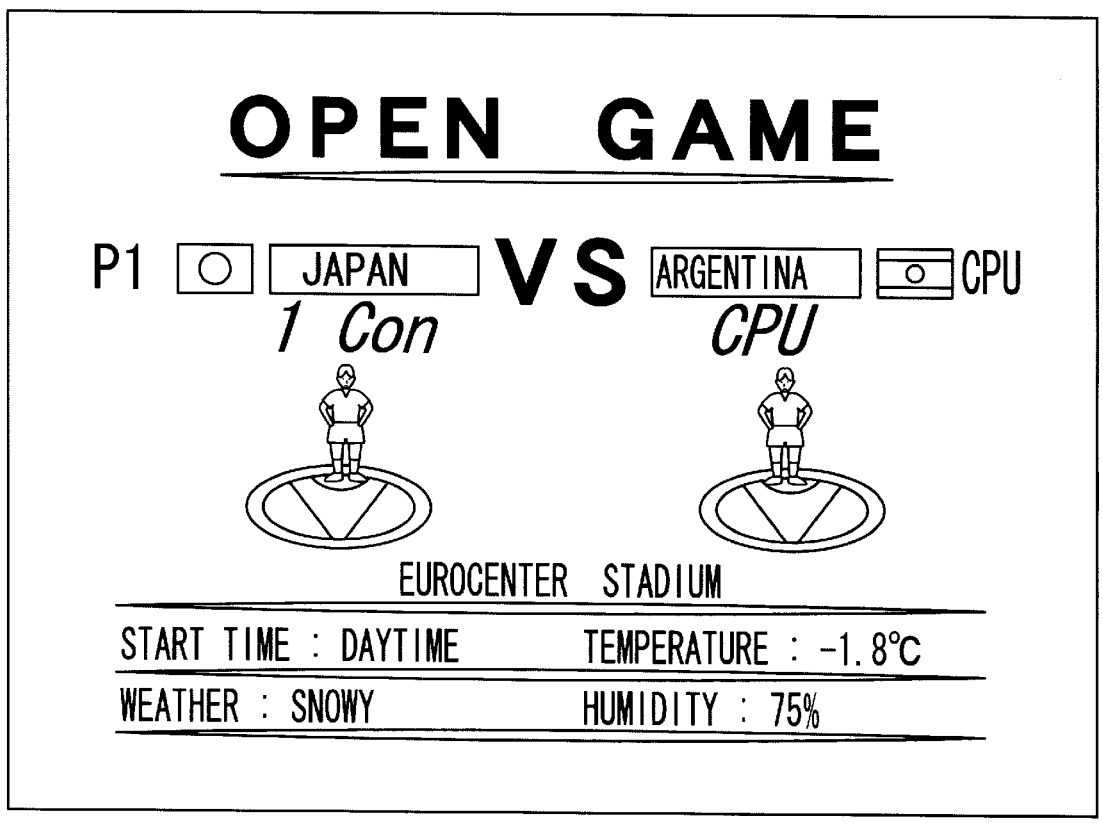
FIG. 4 is a diagram showing another image displaying a soccer field, an atmosphere thereof, and so forth.

In the soccer video game system, various kinds of registration images are displayed prior to the start of a soccer game by means of a registration image display function of the CPU 1. A game mode setting image is first displayed on the display screen in the form of icons indicative of various game modes, such as "open game", "league match" and "tournament". When the game player places a cursor on the icon of the desired game mode by means of the cross key 8d and then pushes the A button 8a, an image of the designated game mode appears on the display screen. For instance, when "open game" is designated, a menu for "match setting" is displayed on the screen to allow the game player to select a team on the side of the game player (hereinafter referred to as "alliance team"), a counterpart team and a stadium where the soccer game is played. When the selection of them is finished, an image as shown in FIG. 2 or 4 is displayed, showing a name of the selected stadium (soccer field) and an atmosphere, such as weather, temperature and humidity, of the stadium (soccer field). This image also includes names of the alliance and counterpart teams selected by the game player, and a start time of the game.

Figure 3:
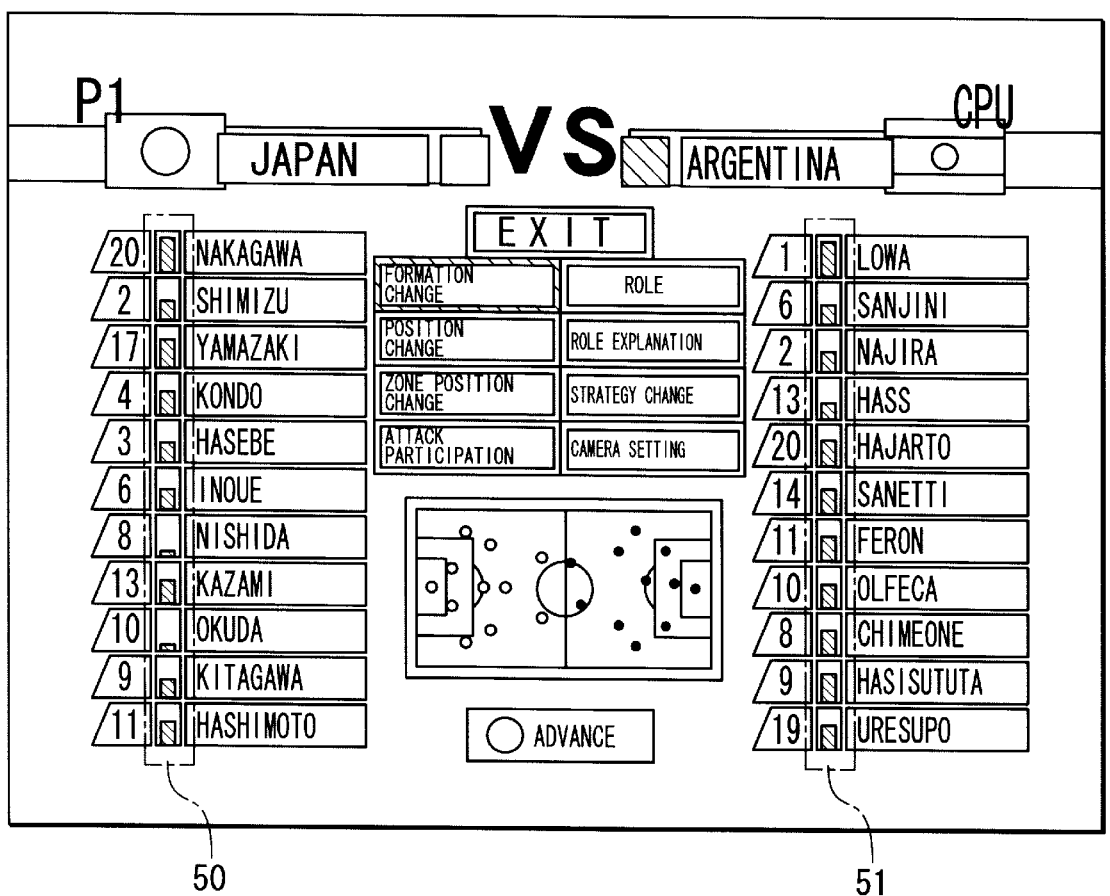
FIG. 3 is a diagram showing an image displaying stamina values of player characters, and so forth.
Figure 5:
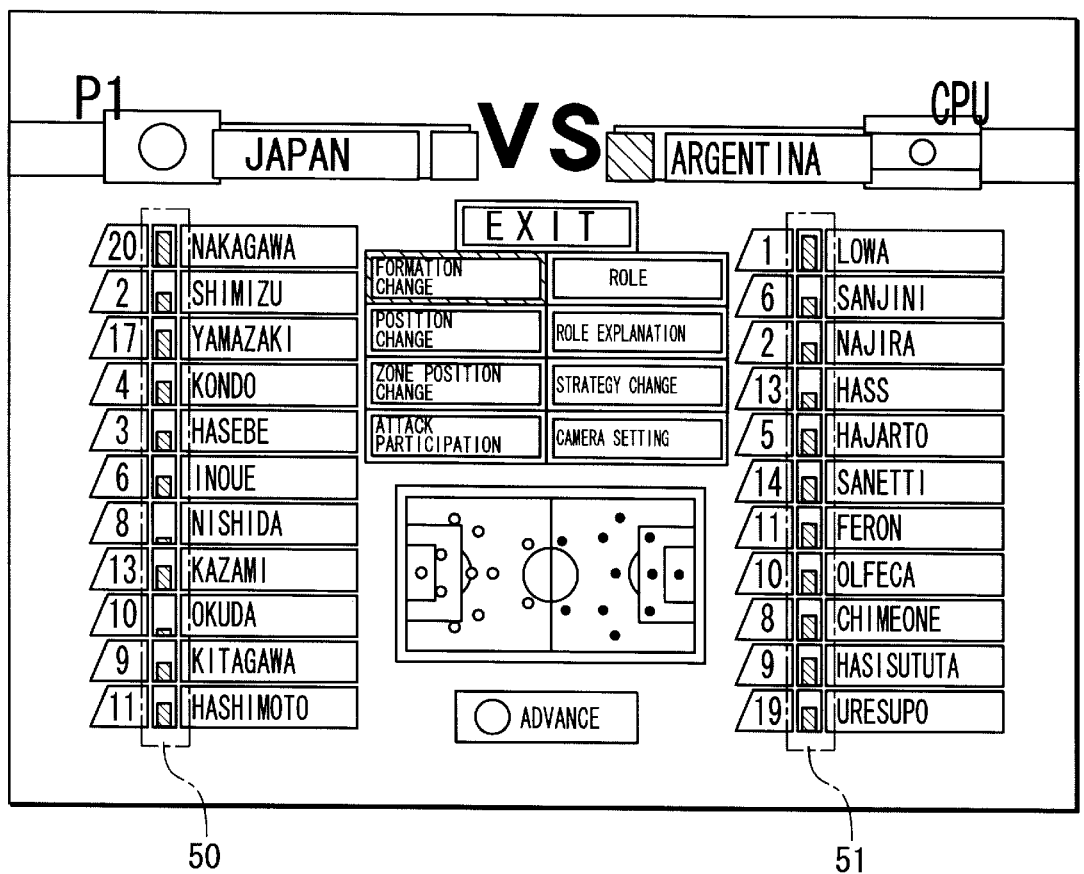
FIG. 5 is a diagram showing another image displaying stamina values of player characters, and so forth.

Then, a "formation edit" image as shown in FIG. 3 or 5 is displayed on the screen. This image includes menu items of "EXIT" which is one of game setting elements and allows exit from the "formation edit" image, "FORMATION CHANGE" for changing the formation (disposition of player characters and a type of development thereafter), "POSITION CHANGE" for adjusting positions of the player characters in each area, "ZONE POSITION CHANGE" for changing positions of the player characters all at once per zone, "ATTACK PARTICIPATION" for setting MF (midfielder) and DF (defender) characters who participate in attack, "ROLE" for changing the role of each player character, and "ROLE EXPLANATION" for explaining or describing each role. The "formation edit" image further includes menu items of "STRATEGY CHANGE" and "CAMERA SETTING".

"FORMATION CHANGE" enables allocation of player characters to three zones of DF, MF and FW (forward). The allocation can be carried out by designating a desired type among a plurality of types of the formation displayed on the screen in the form of a menu, using the A button 8a.

Figure 6:
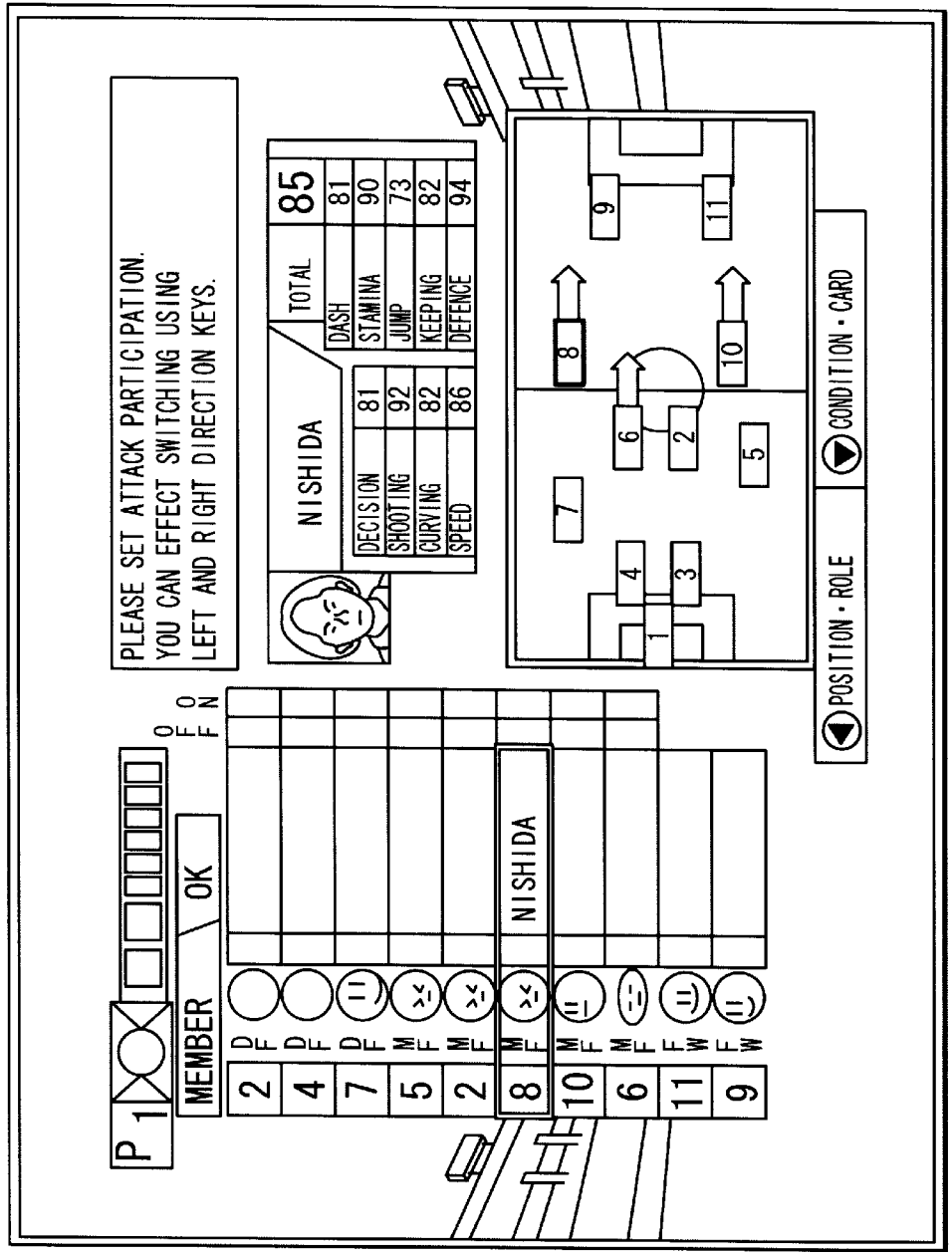
FIG. 6 is a diagram showing an image for setting part of a strategy.

When "POSITION CHANGE" is designated, an image substantially the same as a later-described image shown in FIG. 6 is displayed by the registration image display function of the CPU 1, wherein player characters and their positions are vertically listed. By locating the cursor on one of the player characters by the cross key 8d and pushing the A button 8a, the characteristics (abilities) of the designated player character are displayed in terms of decision making, shooting, shoot curving, speed, dash, stamina, jump, ball keeping and defense. Thus, the game player can set the positions of the player characters taking into consideration the characteristics of the player characters. More specifically, when the game player designates a player character by locating the cursor using the cross key 8d and then pushing the A button 8a, a data setting function of the CPU 1 enables registration of data per player character, while altering the display contents on the screen correspondingly. The foregoing characteristics are represented by numerals from 1 to 99, thereby facilitating the determination. At a lower-right portion of the display screen, the soccer field is displayed along with the position of the designated player character, wherein the position is adjustable in an area using the cross key 8d. The term "area" represents a region which is basically set around each position and does not interfere with the adjacent positions.

When "ZONE POSITION CHANGE" is designated, the game player can change the positions of the player characters all at once for each of the zones DF, MF and FW using the cross key 8d by moving the position of the whole zone to a desired position and then pushing the A button 8a. In this operation, the displayed image is switched so that the whole screen shows the soccer field to facilitate the operation. Further, when the zone is designated by the game player, the brightness thereof is increased to facilitate recognition of the designated zone from the other zones.

When "ATTACK PARTICIPATION" is designated, the image shown in FIG. 6 is displayed by means of the registration image display function of the CPU 1, wherein the player characters forming a team and their positions are listed. The game player can select the player characters the game player wishes to participate in attack, using the stick-type controller 8e or the cross key 8d. In FIG. 6, "Nishida", the No. 8 player character, is selected and the frame of "Nishida" in the list is distinguishably displayed. Further, an image of his face and his characteristics or abilities are shown at an upper-right portion of the display screen. A lower-right portion of the display screen shows the soccer field, wherein arrows are given to the positions of the player characters selected for attack, for easy recognition of the selected player characters and their positions. Then, when the selection of the player characters is finished, the game player presses the A button 8a so that the selected player characters are determined. The processing from the selection of the player characters to the determination thereof, the data registration and the change in display contents on the display screen are implemented by the data setting function of the CPU 1. The setting of the player characters for attack may be carried out per zone.

Figure 7:
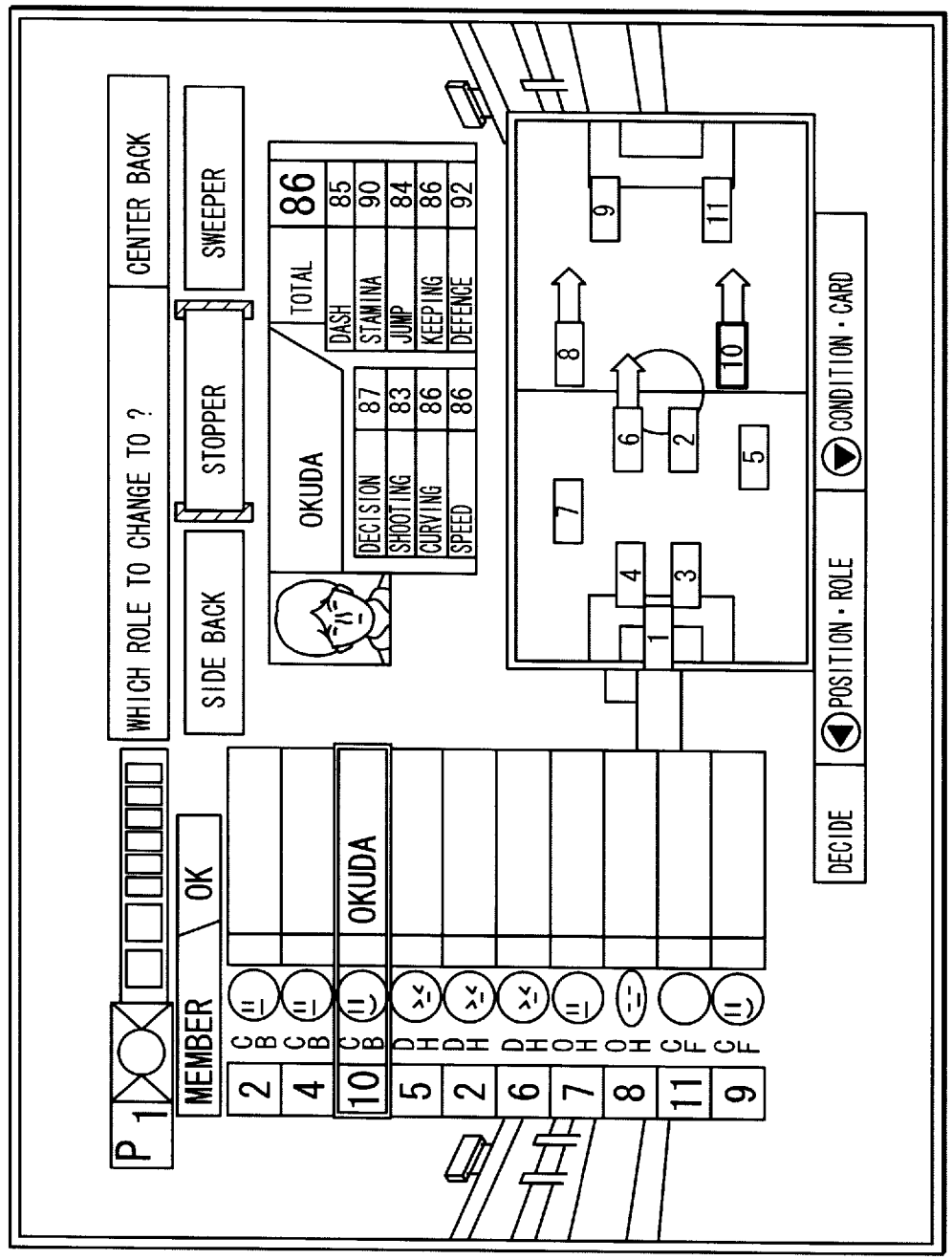
FIG. 7 is a diagram showing an image for setting another part of the strategy.

When "ROLE" is designated, an image of FIG. 7 is displayed wherein the player characters and their positions are listed. The game player can select a player character whose role is to be changed, using the stick-type controller 8e or the cross key 8d, and can determine the role of the player character using the A button 8a. In FIG. 7, "Okuda", the No. 10 player character, is selected and the frame of "Okuda" in the list is distinguishably displayed. Further, an image of his face and his characteristics or abilities are shown at an upper-right portion of the display screen. A lower-right portion of the display screen shows the soccer field, wherein the position of the selected player character is displayed at a different luminance level or in a different color from those of the other player characters, for easy recognition thereof.

Figure 8:
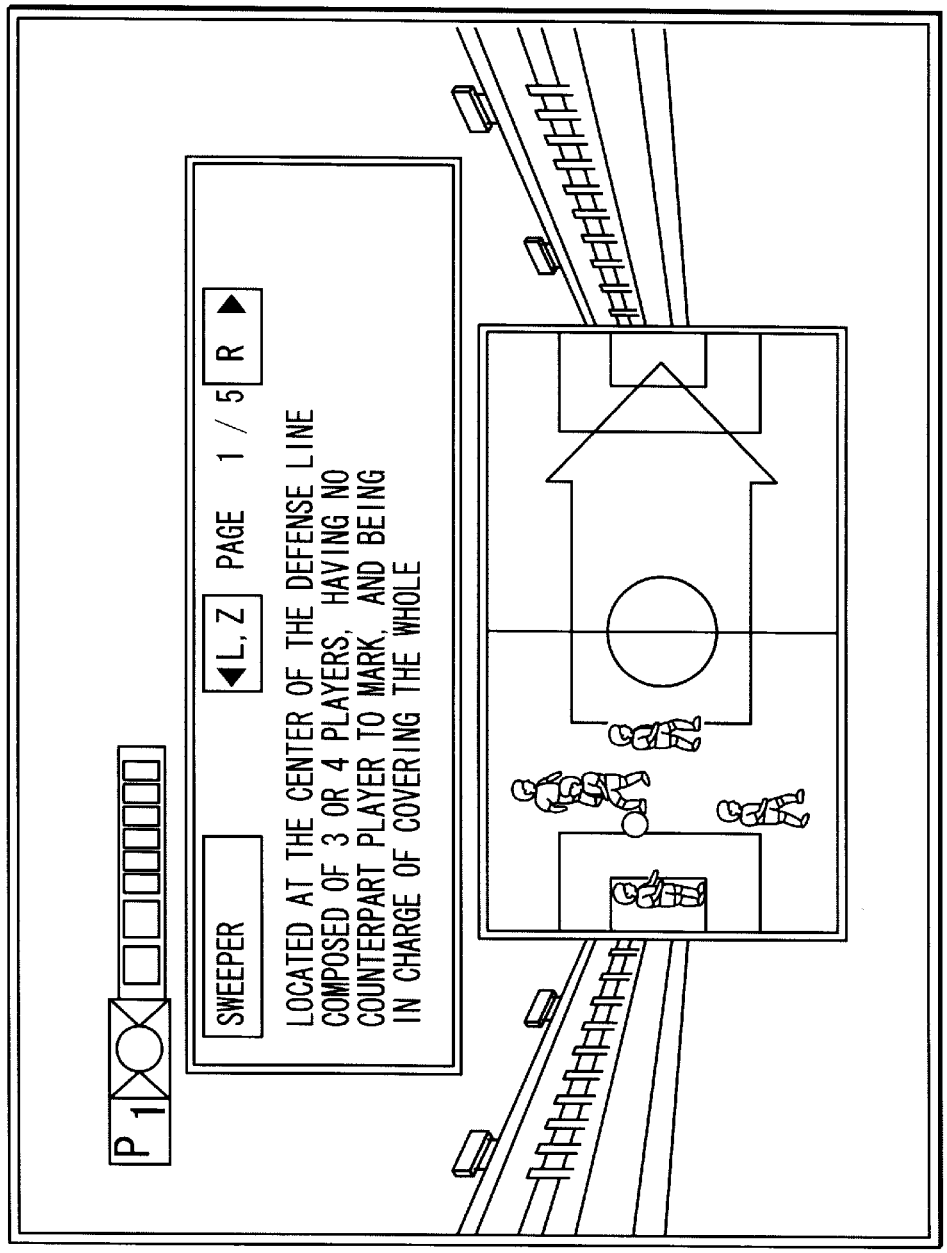
FIG. 8 is a diagram showing an image for setting another part of the strategy.

When "ROLE EXPLANATION" is designated, an image shown in FIG. 8 is displayed. In this image, the role "sweeper" is designated by way of example. The contents of the role "sweeper" are displayed at the center of the display screen, while an image of the soccer field is displayed below it. On the soccer field, the actual motion of a sweeper is displayed in motion images. If the explanation of the role extends over several pages (5 pages in FIG. 8), the preceding page is displayed by pushing the trigger button 8n or the left trigger button 8f, while the next page is displayed by pushing the right trigger button 8g.

Figure 9:
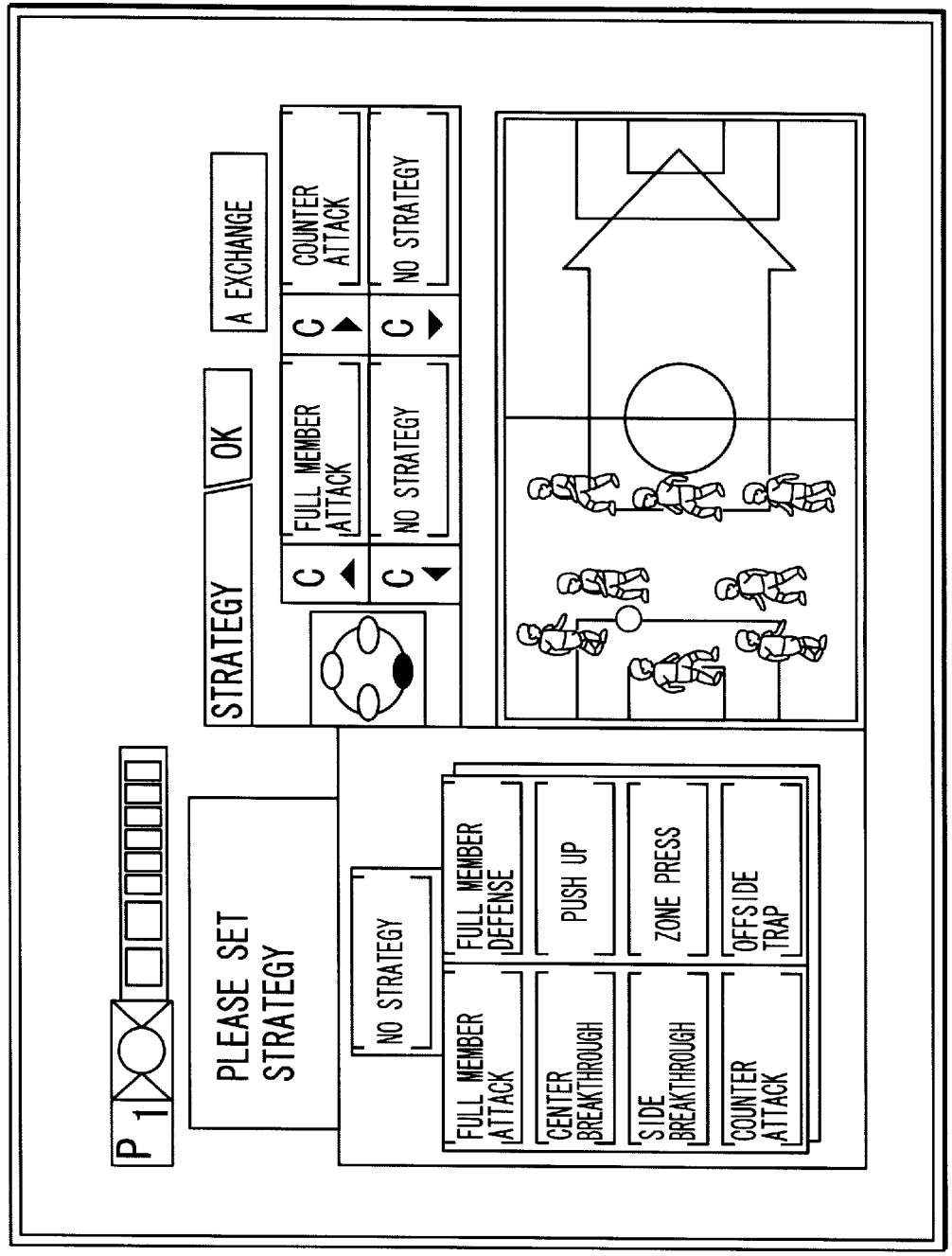
FIG. 9 is a diagram showing an image for setting another part of the strategy.

When "STRATEGY CHANGE" is designated, an image shown in FIG. 9 is displayed. "STRATEGY CHANGE" enables the player characters of the alliance team, except for the player character which is under the control of the game player, to carry out a set strategy on condition that a predetermined event has occurred during the game and that the preselected C button (corresponding to a strategy at the time of the strategy change) has been pressed. A plurality of strategies can be dealt with by using the left trigger button 8f or the trigger button 8n simultaneously with using the C button. As a type of a strategy which can be set by "STRATEGY CHANGE", there are available "FULL MEMBER ATTACK", "FULL MEMBER DEFENSE", "CENTER BREAKTHROUGH", "PUSH UP", "SIDE BREAKTHROUGH", "COUNTER ATTACK" and so forth, as shown in FIG. 9 at the left side thereof. For the purpose of changing the strategy, the game player selects, by means of the stick-type controller 8e or the cross key 8d, one of the C keys corresponding to the strategy which the game player wishes to newly employ. The game player then presses the A button 8a so that the new strategy is determined and registered. An upper-right portion of the display screen displays correlations between the types of the strategies and the buttons for designating them. In the example of FIG. 9, "FULL MEMBER ATTACK" is registered corresponding to the C2 button 8i, while "COUNTER ATTACK" is registered corresponding to the C4 button 8k. Other types of the strategies are not registered as the remaining C2 buttons correspond to "NO STRATEGY". A schematic image of the C buttons is displayed substantially at the center of the display screen. Among the four C buttons in this image, the button/buttons which is/are used to set the corresponding strategy/strategies is/are shown in higher brightness, so that the game player can see which of the C buttons is/are used for the strategy setting. The processing for setting the strategies, registering the strategies and changing the display contents is implemented by a command setting function of the CPU 1.

Figure 10:
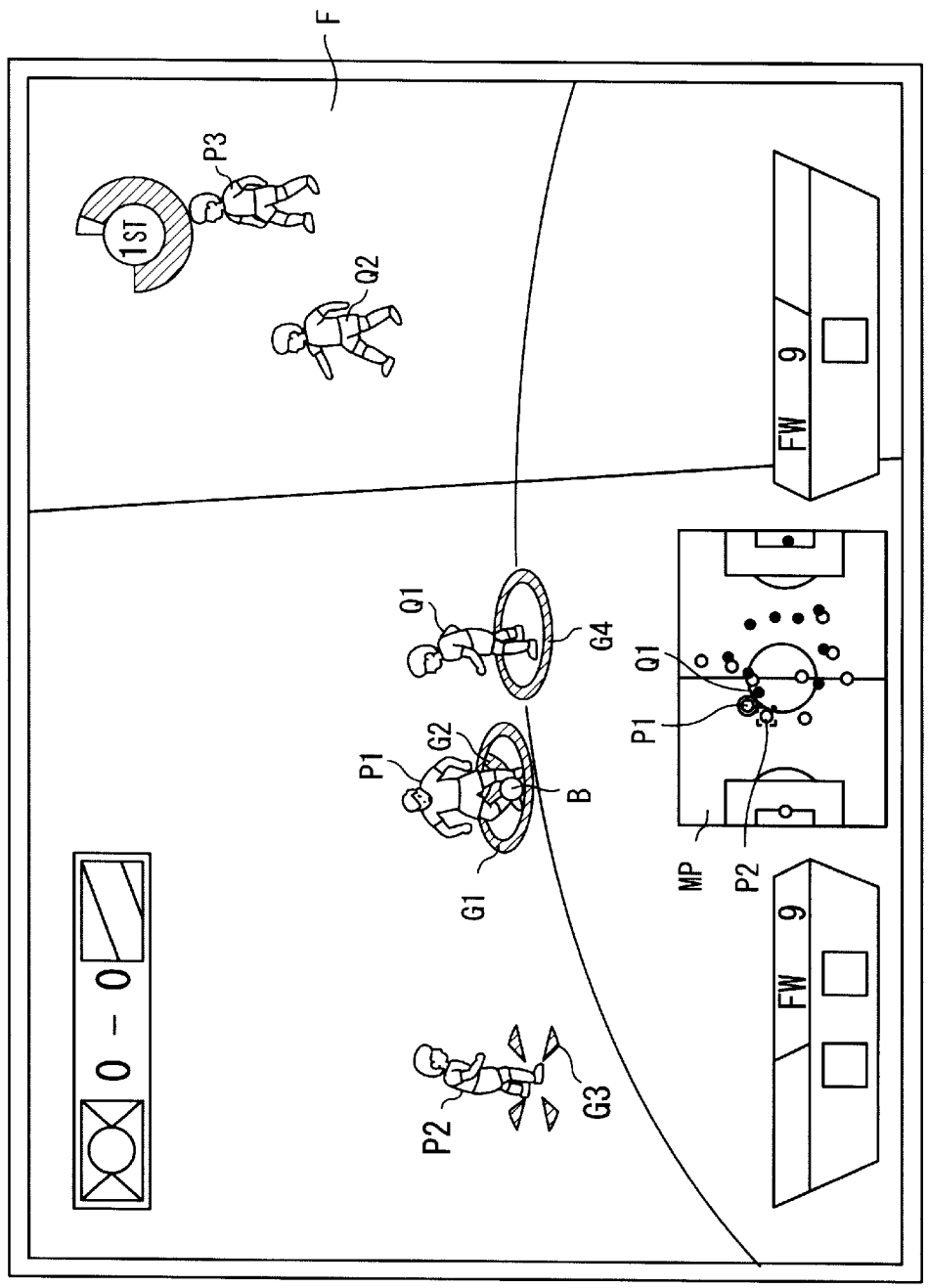
FIG. 10 is a diagram showing an image of a scene during a soccer game.
Figure 11:
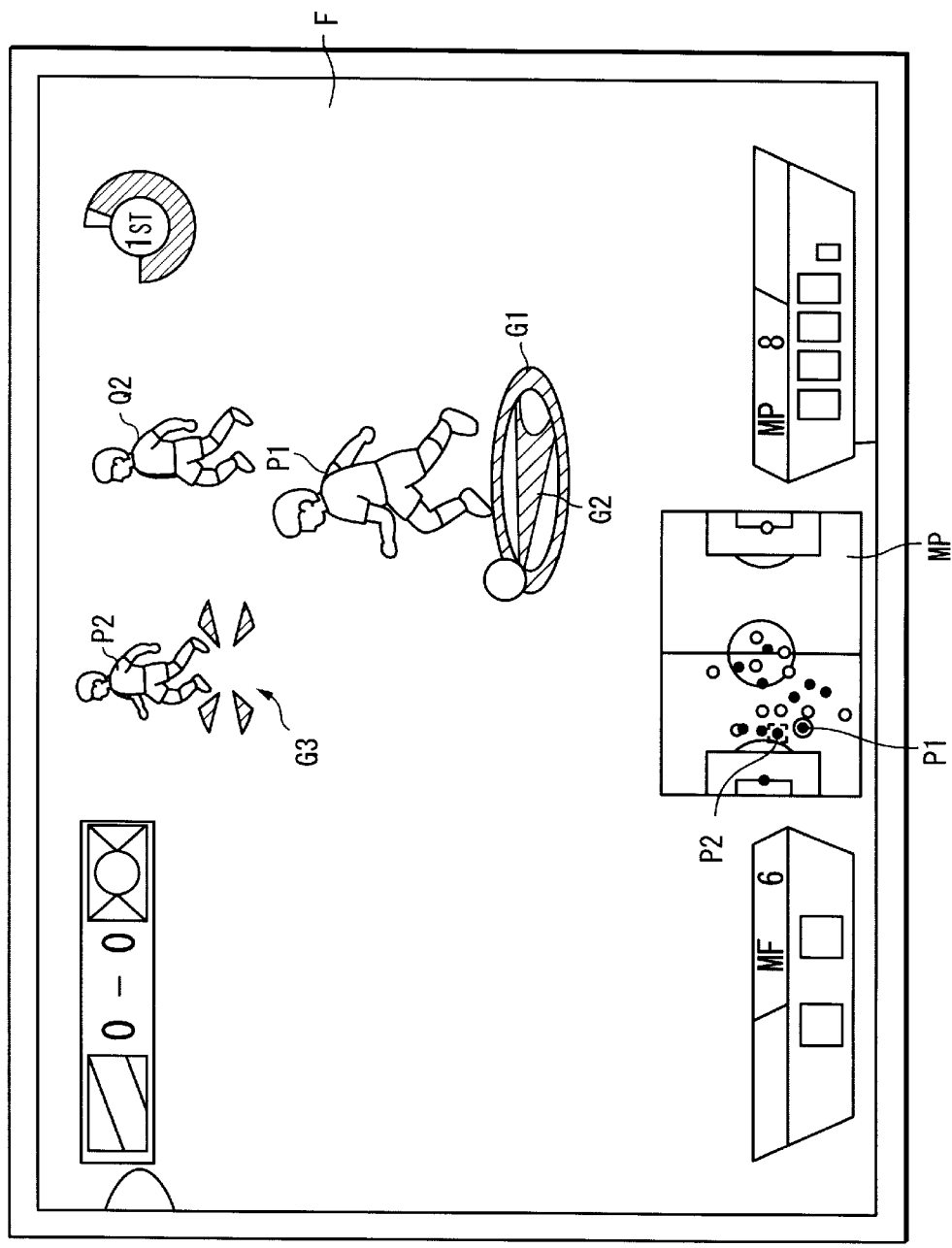
FIG. 11 is a diagram showing an image of another scene during the soccer game.

FIGS. 10 and 11 illustrate game images showing certain states during the soccer game, respectively. When the start button 8c is pressed during the game, the image is paused to enable the game player to set environmental conditions. Specifically, in response to the pressing of the start button 8c, various modes, such as "CHANGE PLAYER CHARACTER", "REPLAY", "CAMERA ZOOMING", "CAMERA HEIGHT" and "CONTINUE GAME", are displayed in the form of icons. When "CAMERA ZOOMING" is selected, the menu image is changed to a pause image, wherein the game player can change the size of a cameral image, i.e. the game player can adjust zoom-in or zoom-out in terms of "near", "intermediate" and "far", using the stick-type controller 8e or the cross key 8d. When "CAMERA HEIGHT" is selected, the menu image is changed to a pause image, wherein the game player can adjust the height of the viewing position, i.e. the camera position, in terms of "low, "intermediate" and "high", using the stick-type controller 8e or the cross key 8d. Then, by pressing the start button 8c, the game image is again displayed on the screen. The lateral or horizontal movement of the camera is automatically controlled so that the camera chases a ball to display the ball at the center of the screen as much as possible.

As shown in FIGS. 10 and 11, a match card is shown at the upper-left corner of the display screen, a score is shown just on the right thereof, and a remaining time is shown at the upper-right corner of the display screen. On the other hand, a name of a player character now operated by the game player is shown at the lower-left corner of the display screen, while a name of a nearby counterpart player character is shown at the lower-right corner of the display screen.

In the image shown in FIG. 10, a player character P1 keeping the ball and operated by the game player, a nearby counterpart player character Q1 and a nearby alliance player character P2 are displayed substantially at the center of the display screen. Further, another counterpart player character Q2 is displayed at the right side of the soccer field, and another alliance player character P3 is displayed behind the counterpart player character Q2. Basically, the player character operated by the game player is the player character P1 keeping the ball. For facilitating recognition of the player character P1, the CPU 1 is provided with a monitoring function for monitoring and identifying the player character P1 keeping the ball, a guide display function for displaying a ring-shaped guide G1 on the soccer field plane around the player character P1, and a direction guide display function for displaying, in a color different from that of the guide G1, a guide G2 which indicates the direction of movement of the player character P1 or the direction of the ball as viewed from a foot of the player character P1 so as to facilitate recognition of the direction, A guide G3 is shown so as to radially extend in four directions from the feet of the nearby alliance player character P2 who basically is a player character the ball can be passed to. The guide G3 is displayed by a second guide display function of the CPU 1 in the same color as the foregoing guide G1. The second guide display function is arranged such that even when the player character P2 disappears from the display screen so that the game player can not see the guide G3, a portion of the guide G3 is still displayed at the end of the display screen so as to show an adequate direction to the game player in which the player character P1 should pass the ball.

In FIG. 10, a ring-shaped guide G4 of a color different from that of the player character P1 is displayed around the nearby counterpart player character Q1 by means of a third guide display function of the CPU 1 for giving caution to the game player. In FIG. 11, the counterpart player character Q1 with the guide G4 is not displayed. This shows that the displayed counterpart player character Q2 is not a counterpart player character who is the nearest to the player character P1 and that a closer counterpart player character exists around the player character P1 although it is out of the display screen and thus invisible.

The operational instructions for the motion of the player character P1 will be briefly explained hereinbelow. The player character P1 is moved according to the instructions given through operations of the buttons of the controller 8. The game player can set an operation pattern suitable for the game player. For instance, the game player can instruct, upon attacking, a moving direction of the player character while dribbling, by means of the stick-type controller 8e. Other motions can be achieved by using the buttons together with the stick-type controller 8e. For instance, the A button 8a is used for "pass", and the B button 8b is used for "shoot". Among the C buttons, the C1 button 8h is used for "throughpass", the C2 button 8i is used for "dash", the C3 button 8j is used for "fly ball", and the C4 button 8k is used for "one-two pass". Upon defending, the game player can set desired motions of the player character Q1 using those buttons in the same manner as that for the player character P1.

This game has two modes. One is for a single game player, wherein the game player competes with a computer team, while the other is for two game players, wherein the game players compete with each other. In each mode, positions of the player characters other than the player character P1 (both P1 and Q1 in the latter mode) are derived and controlled by the computer according to a game program which follows the actual rules of the soccer game as much as possible.

The CPU 1 has a map display function which enables a map MP, schematically showing the whole soccer field, to be displayed at a lower central portion of the display screen. In the map MP, the alliance player characters and the counterpart player characters are displayed in different colors, so that the game player can always recognize the positions of the player characters P1 and P2 and all the other player characters in the whole soccer field, even when the main part of the display screen only shows part of the soccer field F.

The game system according to the preferred embodiment of the present invention is characterized in that an ability value of each player character is changed according to the temperature and the humidity, as an atmosphere, of the soccer field. Specifically, a value of stamina (one of the foregoing characteristics or abilities) of each player character is reduced more rapidly as the temperature increases or as the humidity increases.

Each of the "formation edit" images shown in FIGS. 3 and 5 also shows stamina values of all the player characters of both teams. Specifically, the stamina values are displayed in dashed-line frames 50 and 51 in the form of bar graphs. This image can also be displayed by pressing the start button 8c during the game. As described above, FIGS. 2 and 4 are diagrams each showing the image which displays the soccer field and the atmosphere thereof. This image is displayed prior to the start of the game. It is seen from FIG. 2 that the game is Japan versus Argentina, the soccer field is the African stadium, the game is started in the daytime, the weather is fine, the temperature is 32.8° C. and the humidity is 86%. On the other hand, it is seen from FIG. 4 that the game is Japan versus Argentina, the soccer field is the Eurocenter Stadium, the game is started in the daytime, the weather is snowy, the temperature is −1.8° C., and the humidity is 75%. FIG. 3 shows an image which is displayed by pressing the start button 8c after a lapse of a given time from the start of the game shown in FIG. 2, while FIG. 5 shows an image which is displayed by pressing the start button 8c after a lapse of the same time from the start of the game shown in FIG. 4. Accordingly, each of the images shown in FIGS. 3 and 5 displays the stamina values of the respective player characters after the lapse of the same time from the start of the game.

By comparing the stamina values of the player characters "Nishida" and "Okuda" of the Japanese team between FIGS. 3 and 5, it is understood that the reduction of the stamina values is much greater in FIG. 3. This is because both player characters can run fast and their positions are both FW so that running distances of them are longer than those of the other player characters, resulting in larger consumption of the stamina than the other player characters. Further, since both temperature and humidity are higher in the African Stadium than in the Eurocenter stadium, the consumption of the stamina is quicker so that the large difference is resulted as shown in FIGS. 3 and 5. If the stamina value becomes zero, the running speed of the corresponding player character during the game is extremely lowered so that he can not follow the ball. Thus, it is necessary for the game player to carry out a member change or a position change before the stamina value of a player character becomes zero. Alternatively, during a game played in a soccer field at high temperature and/or humidity, it is necessary for the game player to take a strategy in which all the player characters run evenly, so as not to produce such a player character whose stamina value becomes zero before the end of the game.

Accordingly, in the game system according to this embodiment, the game player should elaborate a strategy taking into consideration an atmosphere, i.e. temperature and humidity, of the soccer field, as to which of the player characters loses the stamina or how to prevent the stamina values from becoming zero before the end of the game. Thus, the game player can enjoy an intellectual sports game which is highly attractive.

Now, the game program to be executed by the CPU 1 will be described.

Figure 12:
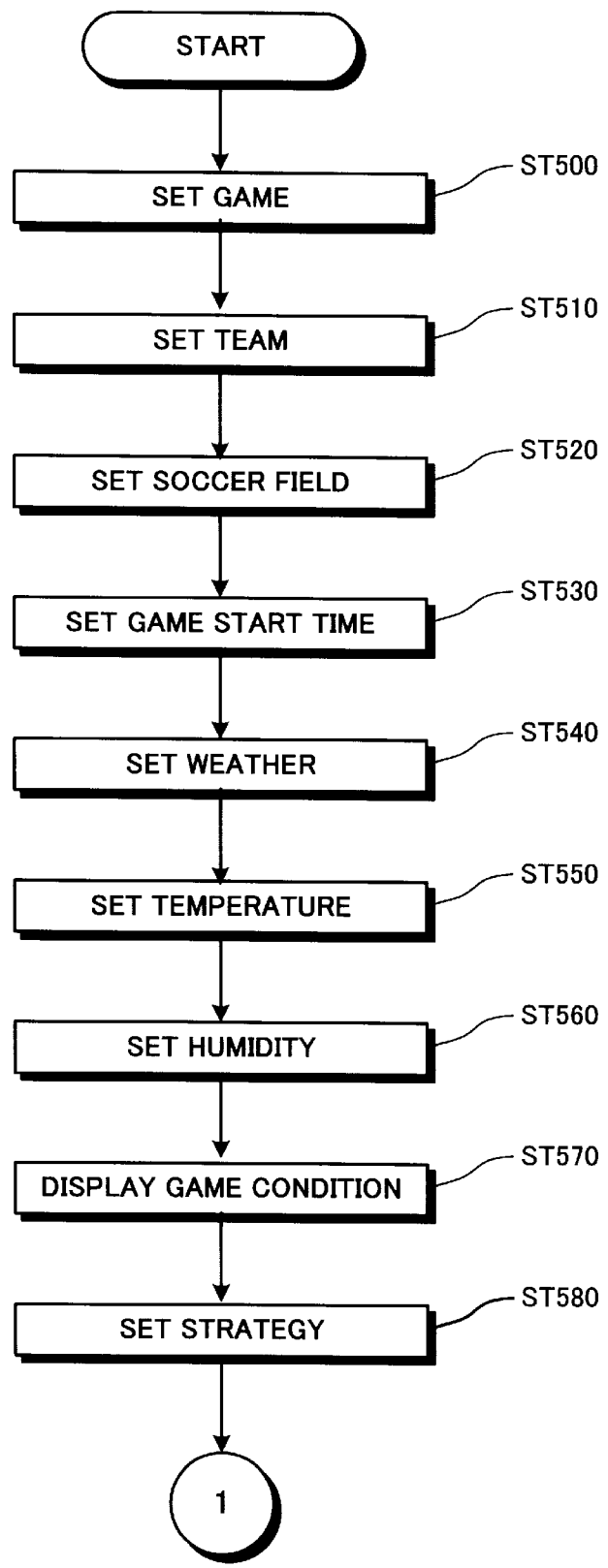
FIGS. 12 and 13 are diagrams of a flowchart showing the flow of the whole game.
Figure 13:
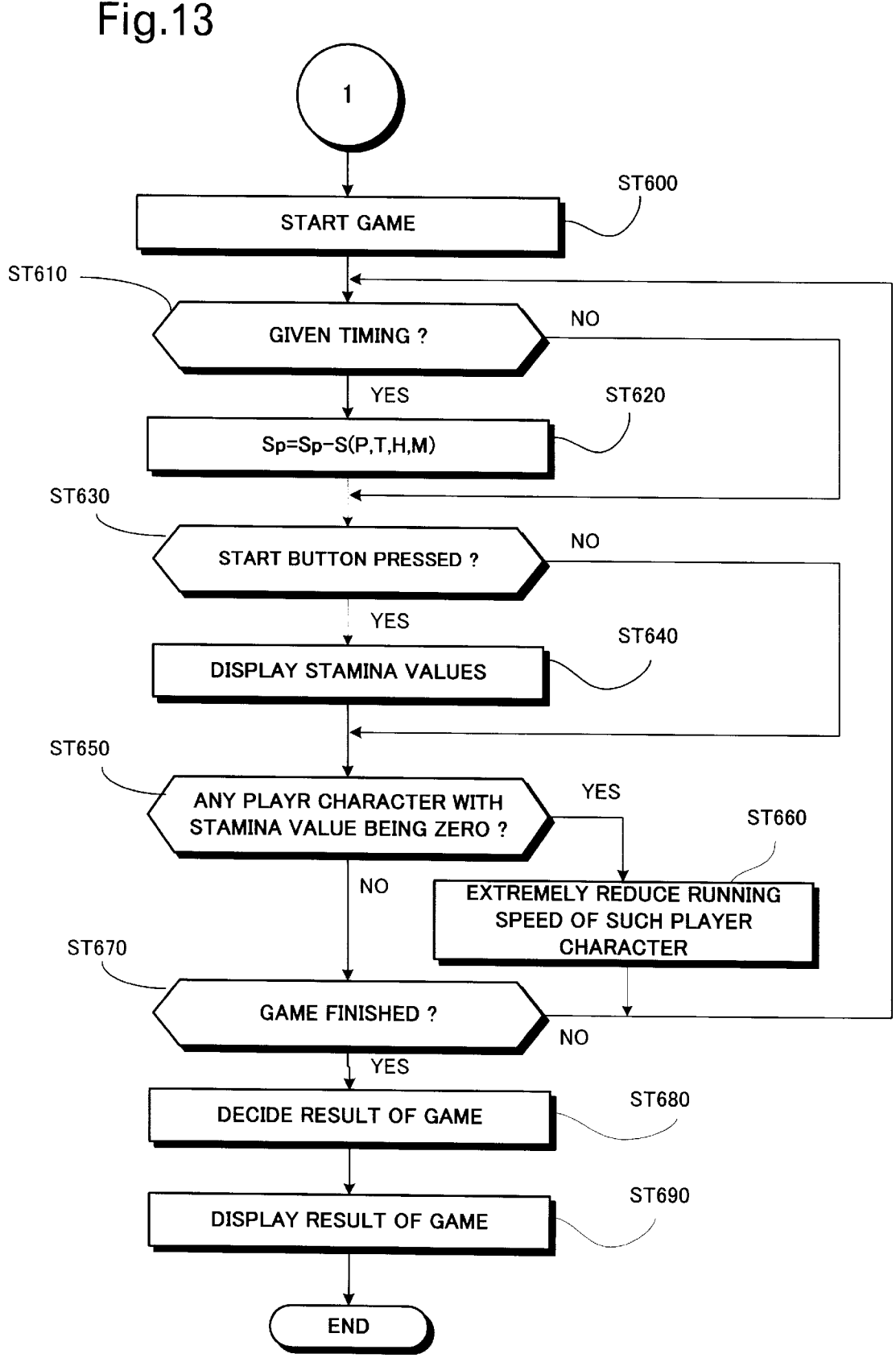

FIGS. 12 and 13 are diagrams of a flowchart showing the flow of processing from the start of the program to the end thereof. After the program is started, the game mode setting image is first displayed on the display screen in the form of icons indicative of various game modes, such as "open game", "league match" and "tournament". When the game player places a cursor on the icon of the desired game mode by means of the cross key 8d and then pushes the A button 8a, the game mode is set (step ST500). Simultaneously, the game player selects either a game for a single player or a game for two players.

Then, the processing proceeds to step ST510 where team setting is carried out. If "league match" or "tournament" and further the game for a single player are selected at step ST500, the computer automatically selects, in response to selection of an alliance team by the game player, a counterpart team. On the other hand, if "open game" is selected at step ST500, the game player can also select a counterpart team even in case of the game for a single player being selected. In this case, the counterpart team selected by the game player is controlled by the computer. In case of the game for two players, the game players select their own teams, respectively.

After the team is set, the processing proceeds to step ST520 where a soccer field is set. If "open game" is selected at step ST500, the game player can select the soccer field. On the other hand, if "league match" or "tournament" is selected, the computer automatically selects the soccer field.

After the soccer field is set, the processing proceeds to step ST530 where the computer sets a game start time, i.e. daytime or nighttime, based on random numbers. If the daytime is set, the game will be played in a naturally light soccer field in the daytime, while if the nighttime is set, the game will be played in a rather dark soccer field with artificial lighting.

After the game start time is set, the computer sets the weather at step ST540, sets the temperature as one of the atmosphere parameters at step ST550, and sets the humidity as the other of the atmosphere parameters (step ST560). The weather, the temperature and the humidity all may be set based on random numbers. Alternatively, only the weather may be set based on random numbers, while temperature and humidity tables in terms of soccer fields and weathers are stored in advance so as to determine the temperature and the humidity using those tables. Alternatively, in the latter case, data of those tables may have a given range so that the temperature and the humidity may be determined within such a range based on random numbers.

After the weather, temperature and humidity are set, the processing proceeds to step ST570 where the computer displays the set team, soccer field, game start time, weather, temperature and humidity in one image. The game player watches this image and elaborates a strategy. Then, at step ST580, the game player selects one of the menu items, such as "FORMATION CHANGE", "POSITION CHANGE", "ZONE POSITION CHANGE", "ATTACK PARTICIPATION", "ROLE" and "STRATEGY CHANGE", displayed in the "formation edit" image so as to set a strategy.

When the setting prior to the start of the game is finished as described above, the game is started at step ST600. Then, per given timing during the game (step ST610), the computer subtracts a value S(P, T, H, M) from a stamina value SP per player character (step ST620). The value S(P, T, H, M) is represented by a function of a player character P, a temperature T, a humidity H and a motion M of the player. If the player character P is strong in a hot and moist atmosphere, the value S(P, T, H, M) becomes small. If the temperature T or the humidity H is low, the value S(P, T, H, M) becomes small. If the motion M of the player character is small, the value S(P, T, H, M) becomes small. Accordingly, this means that a team having more player characters who function strongly in a hot and moist atmosphere is good at a soccer game under an atmosphere at high temperature and humidity and that a player character who is weak in a hot and moist atmosphere should be arranged at a position with less movement. However, since the player characters may also differ in other abilities, such as "speed", "dash" and "shooting", the game player has a number of factors to consider in selecting player characters and their associated playing positions.

During the game, the computer always monitors whether the, start button 8c is pressed (step ST630). If the start button 8c is pressed, the computer stops the game and displays the stamina values of the respective player characters on the display screen (step ST640). The game player watches the stamina values of the respective player characters so as to change the strategy or the positions if necessary.

During the game, the computer also always monitors the stamina values of the respective player characters to see whether there is a player character whose stamina value becomes zero (step ST650), If there is such a player character with the stamina value being zero, the processing proceeds to step ST660 where the running speed of that player character is extremely lowered. Hence, the player character with the stamina value being zero can not almost follow the ball so that such a player character has substantially no significance for the team.

The game is advanced in this fashion, and the computer always monitors an elapsed time to see whether a game finish time has been reached (step ST670). If the game finish time has been reached, the result of the game is decided from a score of both teams (step ST680), the result of the game is displayed (step ST690), and the program is finished.

During the progress of the game, the CPU 1 proceeds with the processing according to setting of commands as follows.

Figure 14A:
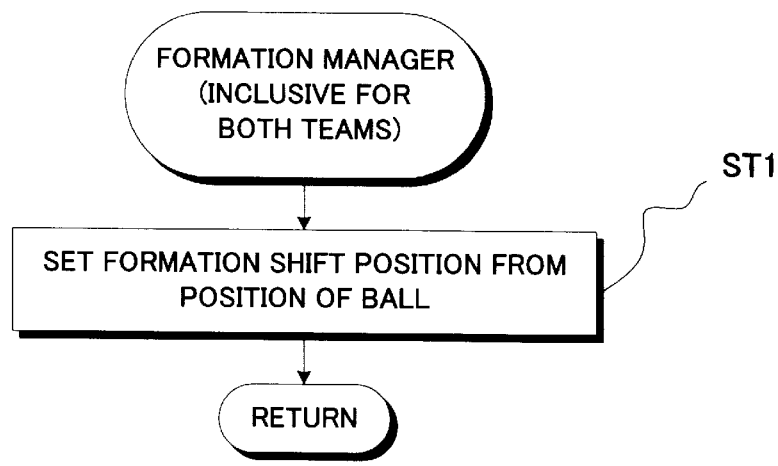
Figure 14B:
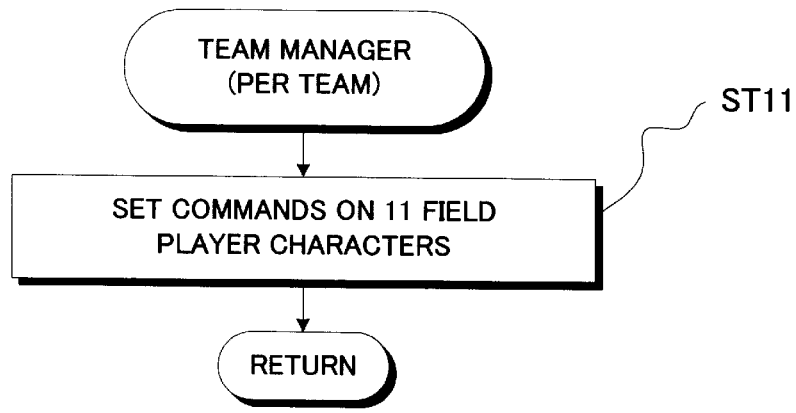
Figure 14C:
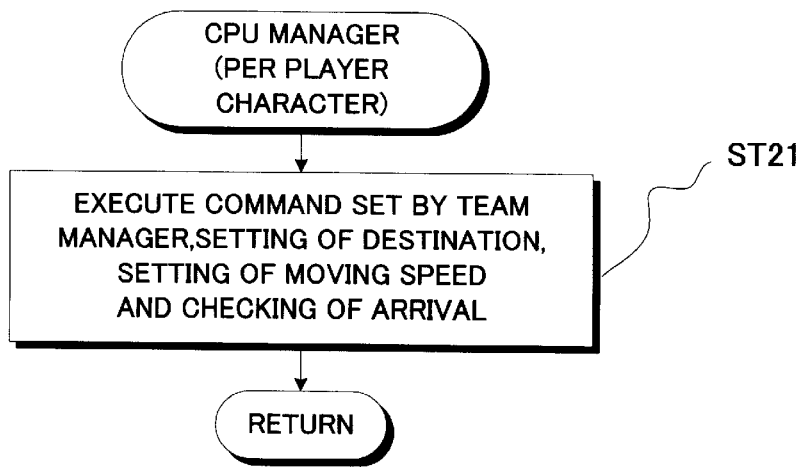

FIGS. 14A to 14C show processes for setting commands by the CPU 1, wherein FIG. 14A is a flowchart representing a formation manager, FIG. 14B is a flowchart representing a team manager, and FIG. 14C is a flowchart representing a CPU manager. In FIG. 14A, the CPU 1 sets a formation shift position program with respect to the position of the ball, inclusively for both teams (step ST1). In FIG. 14B, commands are set on 11 field player characters per team, as will be described later (step ST11). In FIG. 14C, the command set by the team manager on each player character is executed, and setting of the destination, setting of the moving speed and checking as to whether the destination has been reached are performed per player character (step ST21), so that the game can be advanced without failure.

Figure 15:
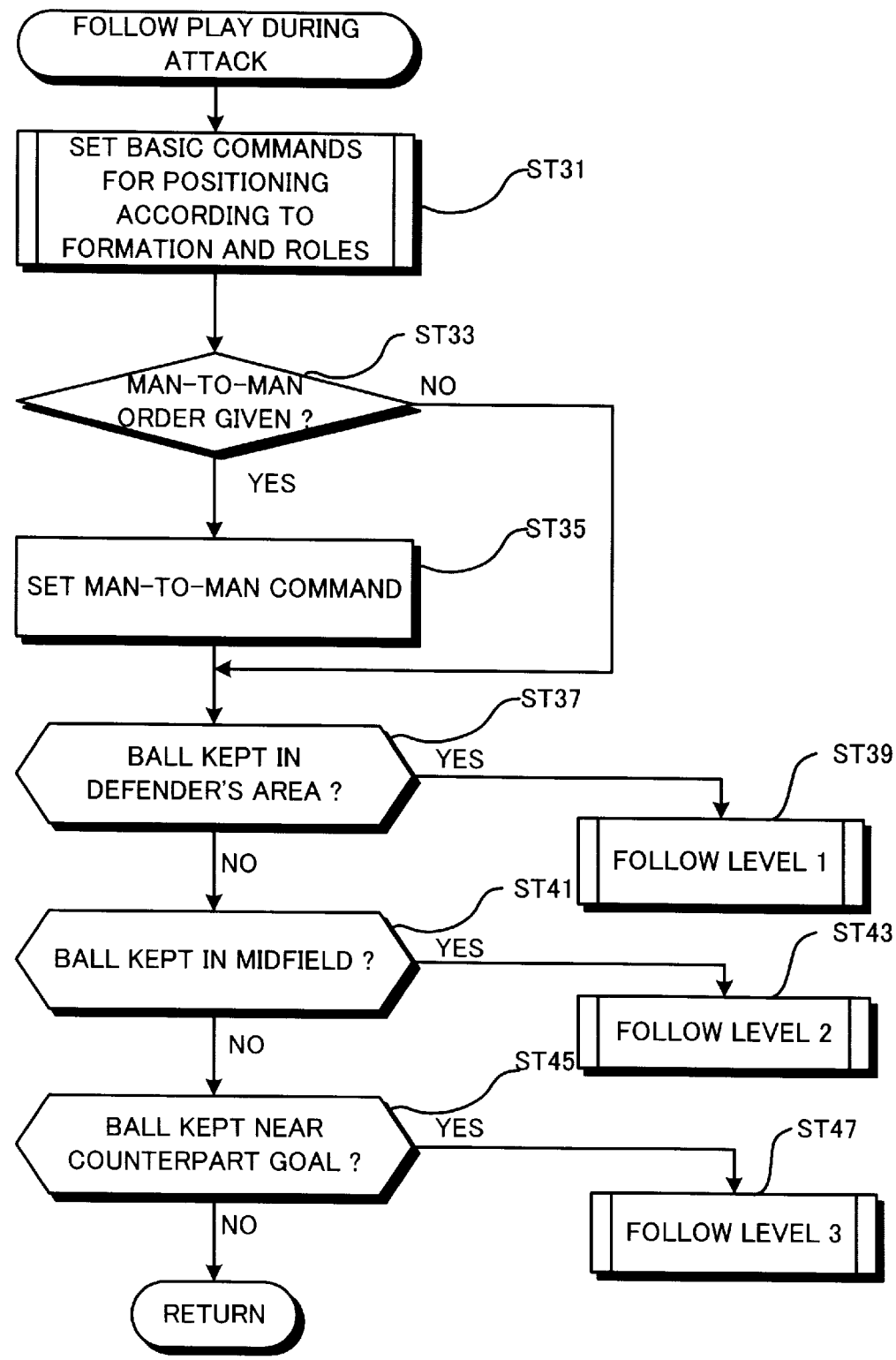
FIG. 15 is a flowchart representing a follow play during attacking.

FIG. 15 is a flowchart representing a follow play during attacking.

First, basic commands are set for positioning the player characters on the soccer field according to the formation and the roles (step ST31). The positions of the player characters are set as the basic positions in the formation, on the soccer field which simulates an actual soccer field, according to the roles of the player characters. Then, it is determined whether a man-to-man order exists (step ST33). If positive, a man-to-man command is set (step ST35). If negative, the processing proceeds to step ST37 skipping step ST35. At step ST37, it is determined whether the ball is kept in the defender's area, if positive, "follow level 1" is set at step ST39. If negative, the processing proceeds to step ST41 which determines whether the ball is kept in the midfield. If positive, "follow level 2" is set at step ST43. If negative, the processing proceeds to step ST45 which determines whether the ball is kept near a counterpart goal. If positive, "follow level 3" is set at step ST47.

Figure 16:
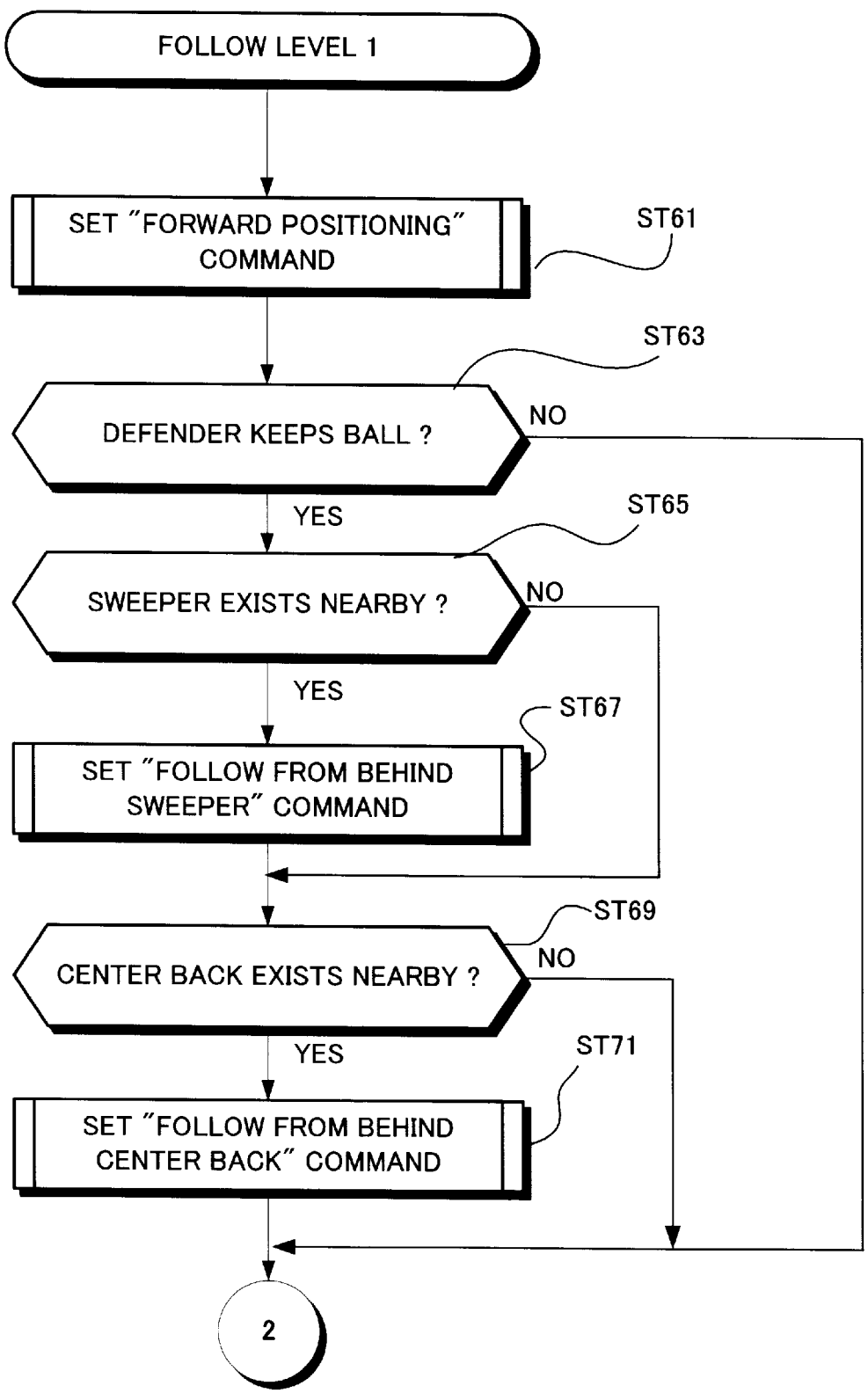
FIGS. 16 and 17 are diagrams of a flowchart showing a subroutine for "follow level 1" shown in FIG. 15.
Figure 17:
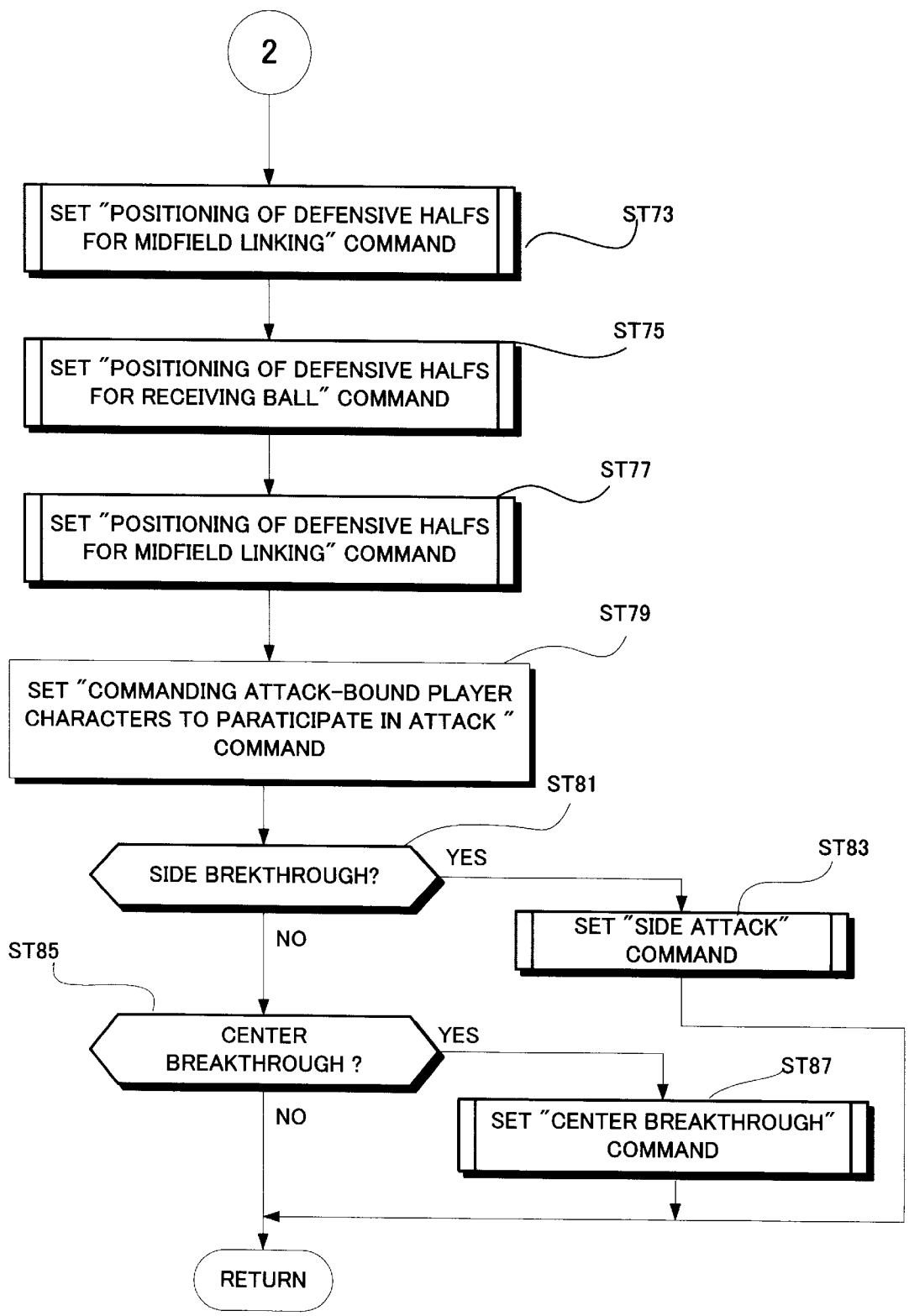

FIGS. 16 and 17 are diagrams of a flowchart showing the subroutine for "follow level 1" shown in FIG. 15.

In the subroutine, a "forward positioning" command is first set at step ST61. The forward positions are set near the defense line of the counterpart team as viewed in the goal direction and at random positions in the transverse directions when it is expected that the ball does not reach the forwards immediately. The forward positioning is also carried out such that when the ball has approached the goal of the counterpart team, the forward positions are set in any locations in the penalty area, while, if the ball is not near the goal of the counterpart team, the forward positions are set to approach the formation positions.

Then, it is determined whether the defender keeps the ball (step ST63). If negative, the process skips to step ST73. If positive, the processing proceeds to step ST65 which determines whether there is a sweeper nearby. If positive, a "follow from behind sweeper" command is set (step ST67). The "follow from behind sweeper" is set at a position which is on the same side of the ball as the alliance goal and such that the follow is done at a position closer to the goal, depending on whether the ball is at the left side or the right side relative to the goal.

Then, it is determined at step ST69 whether the center back exists nearby (within a preset distance). If negative, the processing skips to step ST73. If positive, a "follow from behind center back" command is set at step ST71. Like the "follow from behind sweeper", the "follow from behind center back" is set at a position which is on the same side of the ball as the alliance goal and such that the follow is done at a position closer to the goal, depending on whether the ball is at the left side or the right side relative to the goal.

Then, at step ST73, a command for "positioning of defensive halfs for midfield linking" is set. According to this command, the positions of the defensive halfs are set depending on the position of the ball such that the defensive halfs progressively approach the ball when the ball is within the alliance area.

Subsequently, at step ST75, a command for "positioning of defensive halfs for receiving ball" is set. According to this command, the positions of the defensive halfs are set depending on the position of the ball such that the defensive halfs progressively approach the ball in the goal direction and, in the side directions, such that the defensive halfs are positioned closer to the goal.

Then, at step ST77, a command for "positioning of offensive halfs for midfield linking" is set. The positioning of offensive halfs in midfield is carried out first in the alliance area according to the position of the ball and the position of the soccer field.

Then, at step ST79, a "commanding attack-bound player characters to participate in attack" command is set. Then, step ST81 determines whether the strategy is "SIDE BREAKTHROUGH", while step ST85 determines whether the strategy is "CENTER BREAKTHROUGH". If the strategy is "SIDE BREAKTHROUGH", a command for "SIDE ATTACK" is set at step ST83. On the other hand, if the strategy is "CENTER BREAKTHROUGH", a command for "CENTER BREAKTHROUGH" is set at step ST87.

Figure 18:
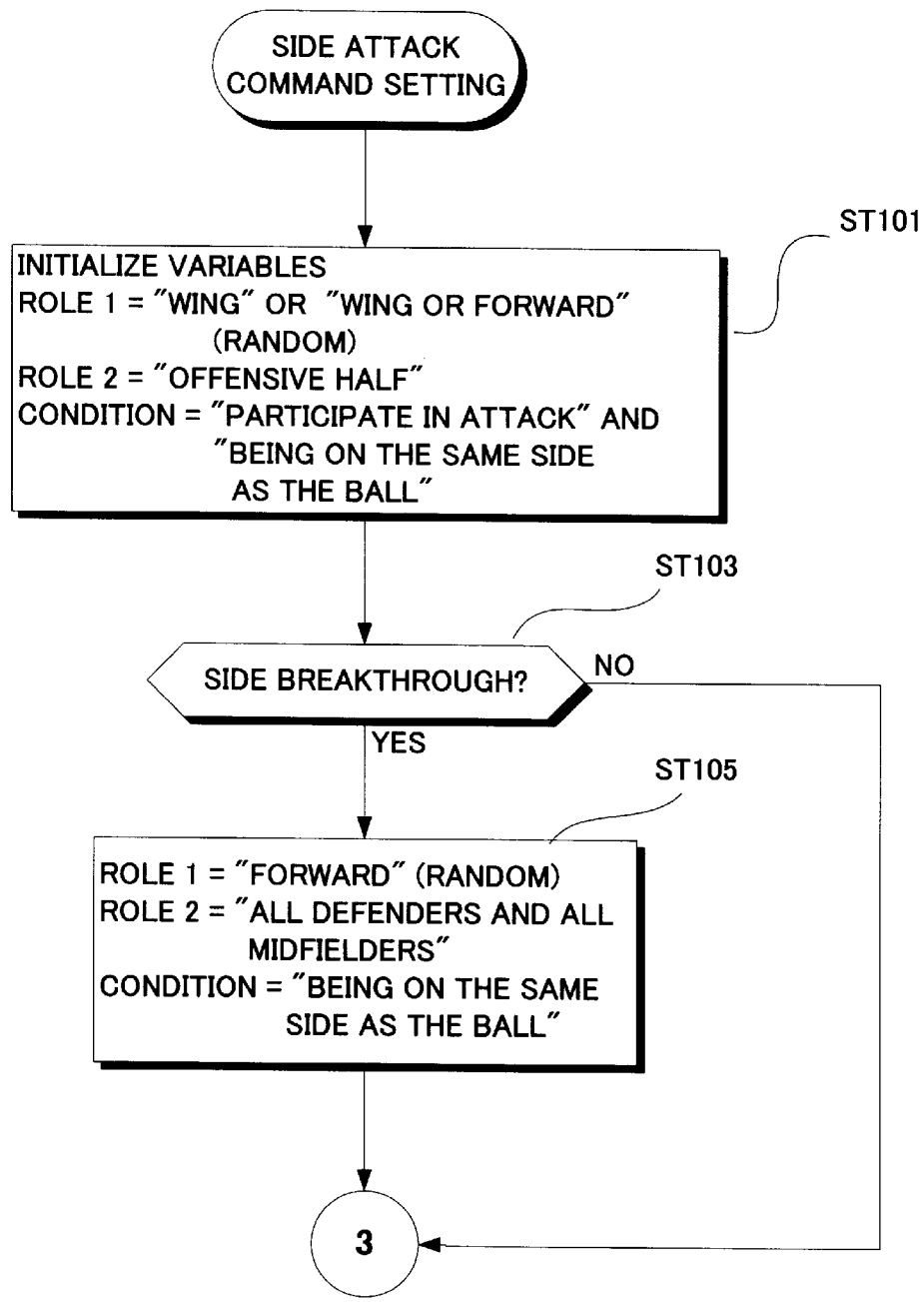
FIGS. 18 and 19 are diagrams of a flowchart showing a subroutine for setting a "SIDE ATTACK" command.
Figure 19:
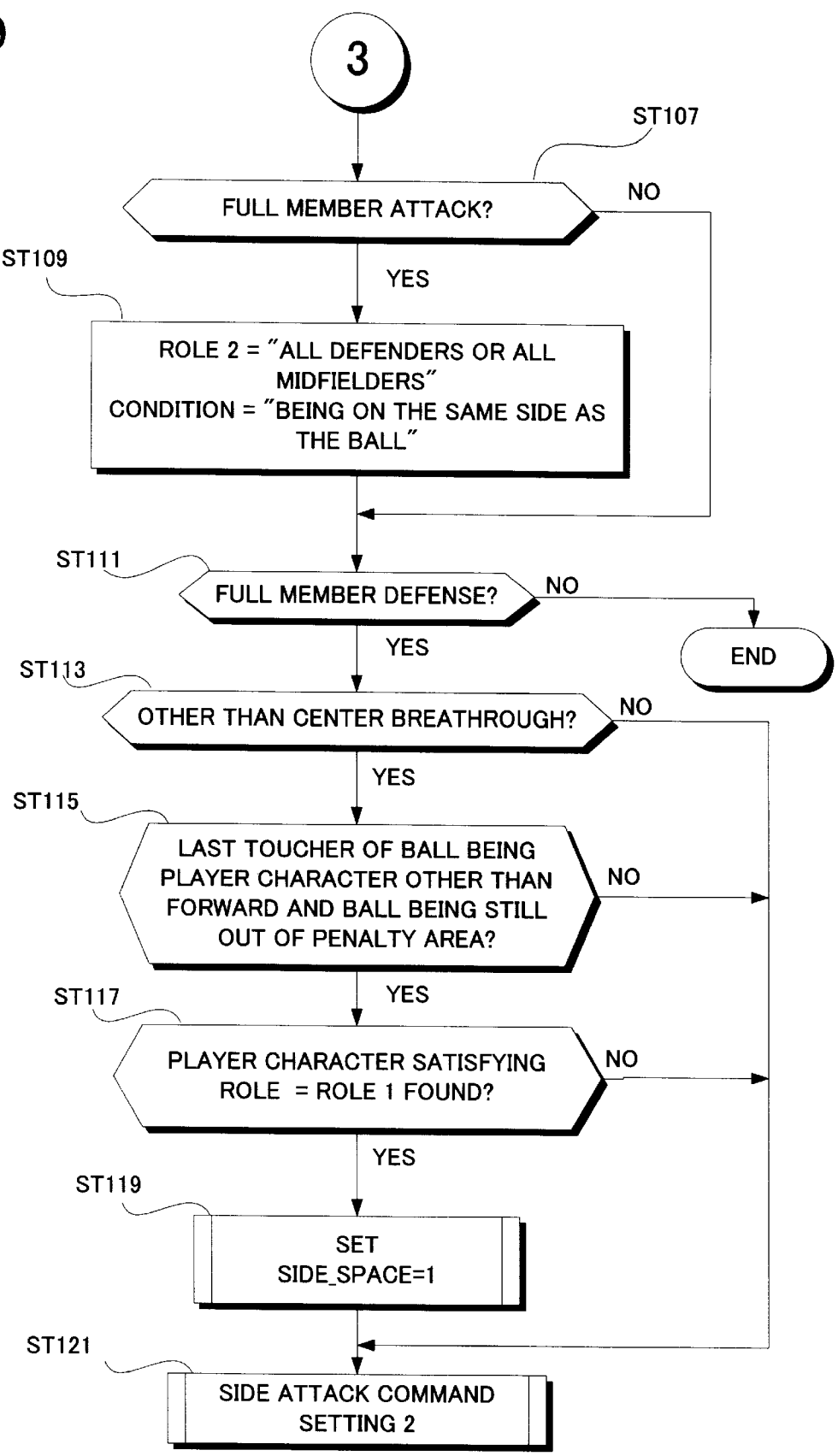

FIGS. 18 and 19 are diagrams of a flowchart showing the subroutine for setting the "SIDE ATTACK" command. "ROLE 1" as a variable for searching represents "ROLE" 1 which identifies the role of the player character on which the command is to be set, while "ROLE 2" as another variable represents "ROLE" 2 which identifies the role of the player character on which the command is to be set. These roles are selectively used as the prerequisite for the searching. "CONDITION" represents the condition under which the command is to be set. "SIDE_SPACE" represents a flag indicative of whether the side space is used.

Referring to FIG. 18, at step ST101, the variables are first initialized, then ROLE 1 is set randomly to "ROLE 1="WING" or "WING OR FORWARD"", ROLE 2 is set to "ROLE 2="OFFENSIVE HALF"", and CONDITION is set to "CONDITION="PARTICIPATE IN ATTACK" and "BEING ON THE SAME SIDE AS THE BALL"". Then, it is determined at step ST103 whether the strategy is "SIDE BREAKTHROUGH". If the strategy is "SIDE BREAKTHROUGH", the processing proceeds to step ST105 where ROLE 1 is set randomly to "ROLE 1="FORWARD"", ROLE 2 is set to "ROLE 2="ALL DEFENDERS OR ALL MIDFIELDERS"", and CONDITION is set to "CONDITION="BEING ON THE SAME SIDE AS THE BALL"". If the strategy is not "SIDE BREAKTHROUGH", the processing proceeds to step ST107 skipping step ST105.

Step ST107 determines whether the strategy is "FULL MEMBER ATTACK". If positive, the processing proceeds to step ST109 which sets "ROLE 2="ALL DEFENDERS OR ALL MIDFIELDERS "" and "CONDITION="BEING ON THE SAME SIDE AS THE BALL"".

Step ST111 determines whether the strategy is "FULL MEMBER DEFENSE". If positive, step ST115 determines whether the last toucher of the ball is a player character other than a forward and the ball is still out of the penalty area, on condition that the strategy is not "CENTER BREAKTHROUGH" (YES at step ST113). If the answer at step ST115 is positive, the processing proceeds to step ST117 which sets only "ROLE=ROLE 1" as the sole prerequisite for searching for a player character on which the command is to be set. If the player character satisfying the prerequisite set at step ST117 is found, the processing proceeds to step ST119 where "SIDE_SPACE=1" representing the use of the side space is set as a command for "MOTIONS OF WINGS". If no corresponding player character is found at step ST117, the processing proceeds to step ST121 skipping step ST119. According to the command for "MOTIONS OF WINGS", positions of the wings are set from the alliance area and the positions set by the formation, so as to be rather close to the touch line.

Then, "SIDE ATTACK COMMAND SETTING 2" is executed.

Figure 20:
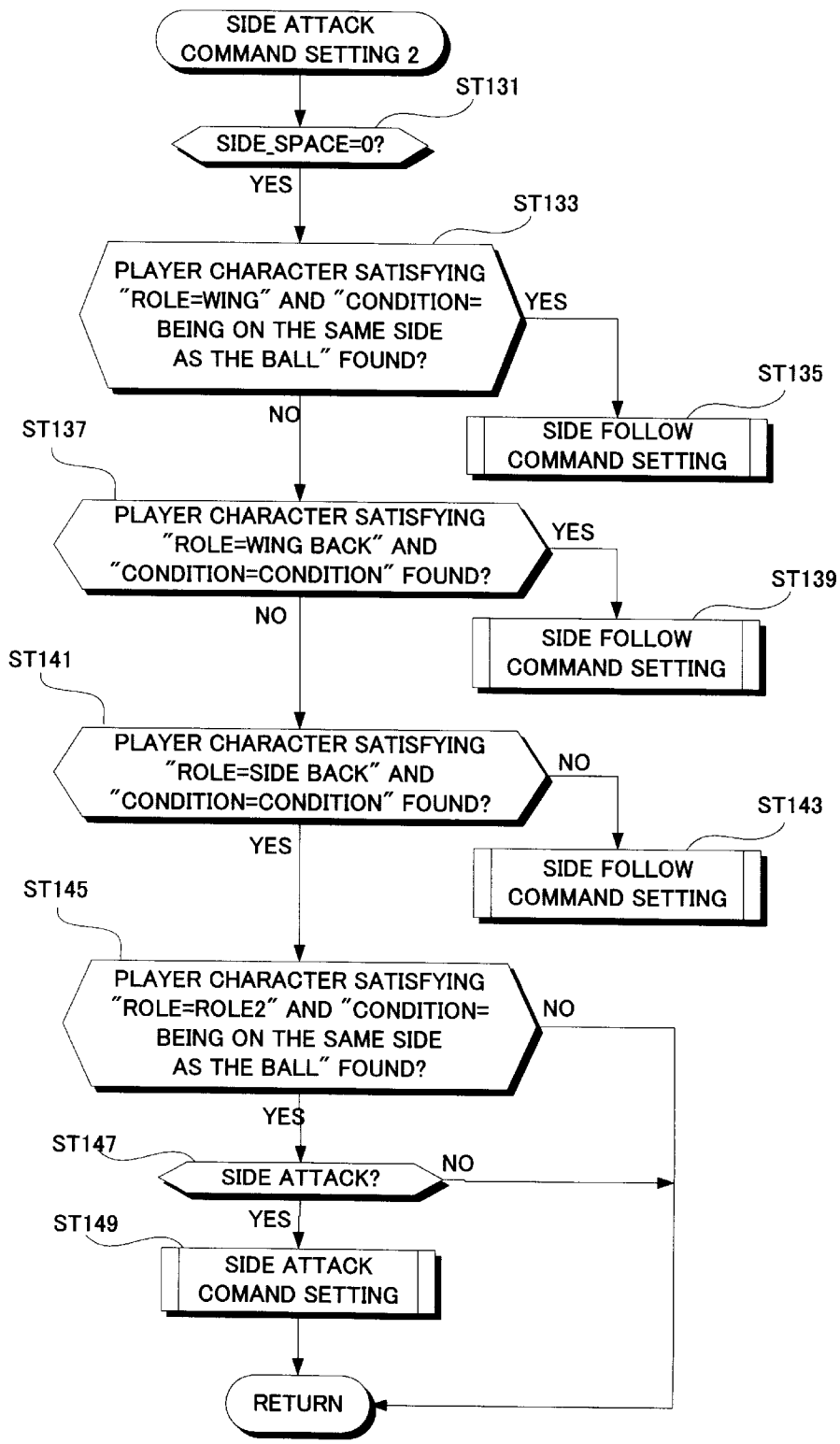
FIG. 20 is a flowchart showing a subroutine for "SIDE ATTACK COMMAND SETTING 2"

FIG. 20 is a flowchart showing the subroutine for "SIDE ATTACK COMMAND SETTING 2". First, at step ST131, it is determined whether any side space is available, i.e. whether SIDE_SPACE=0. If the side space is available, the processing proceeds to step ST133 which sets "ROLE= WING" and "CONDITION=BEING ON THE SAME SIDE AS THE BALL" as the searching prerequisites for searching for a player character on which the command is to be set. If any player character satisfying such searching prerequisites exists, the processing proceeds to step ST135 where "SIDE FOLLOW COMMAND SETTING" is executed. On the other hand, if no corresponding player character is found, the processing proceeds to step ST137 which sets "ROLE= WING BACK" and "CONDITION=CONDITION" as the searching prerequisites. If any player character satisfying these searching prerequisites exists, the processing proceeds to step ST139 where "SIDE FOLLOW COMMAND SETTING" is executed. On the other hand, if no corresponding player character is found, the processing proceeds to step ST141 which sets "ROLE=SIDE BACK" and "CONDITION=CONDITION" as the searching prerequisites. If any player character satisfying these searching prerequisites exists, the processing proceeds to step ST143 where "SIDE FOLLOW COMMAND SETTING" is executed. On the other hand, if no corresponding player character is found, the processing proceeds to step ST145 which sets "ROLE=ROLE 2" and "CONDITION=BEING ON THE SAME SIDE AS THE BALL" as the searching prerequisites. If any player character satisfying these searching prerequisites exists, the processing proceeds to step ST147 which determines whether the strategy is "SIDE ATTACK". If the strategy is "SIDE ATTACK", the processing proceeds to step ST149 where a "SIDE ATTACK" command is set. The "SIDE ATTACK" command is executed such that the player character, when it is behind the ball, runs outside the player character keeping the ball, while, when it is forward of the ball, the player character runs forward along the touch line.

Figure 21:
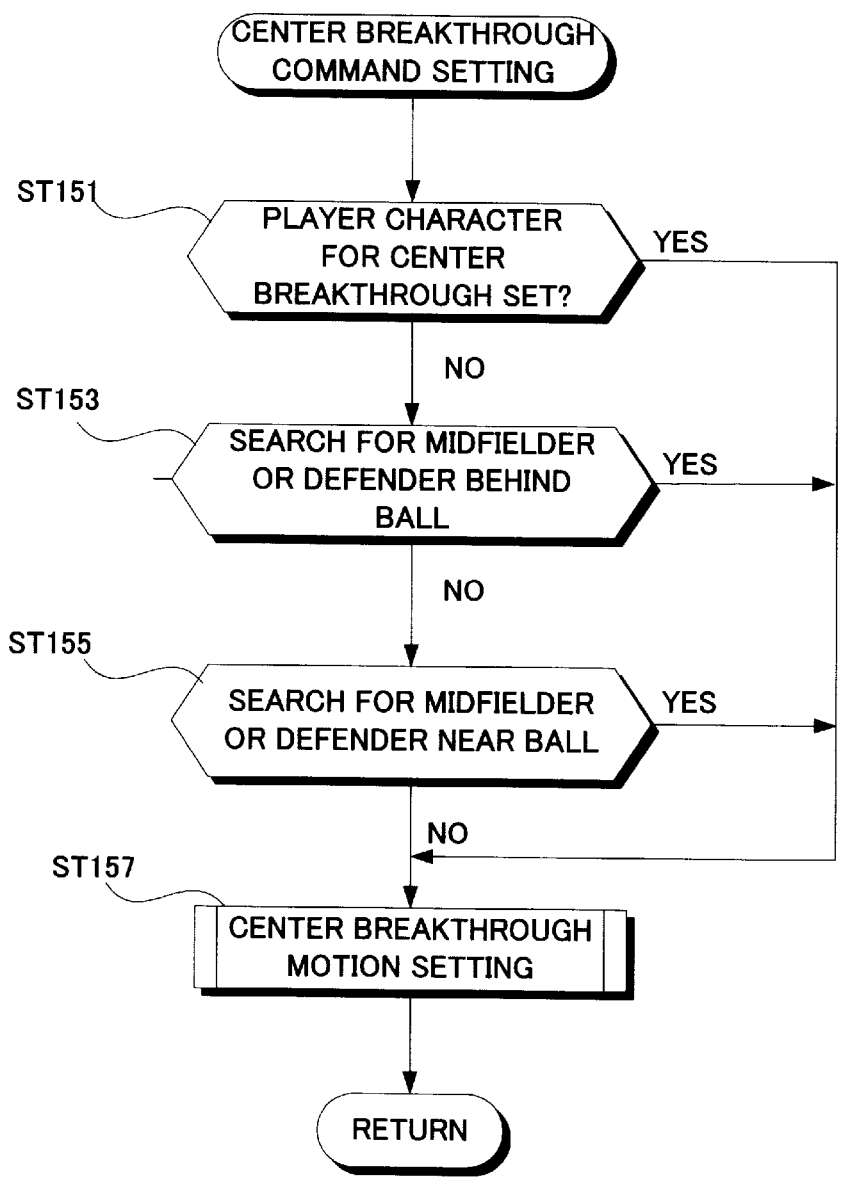
FIG. 21 is a flowchart showing a subroutine for setting a "CENTER BREAKTHROUGH" command.

FIG. 21 is a flowchart showing the subroutine for setting the "CENTER BREAKTHROUGH" command. First, step ST151 determines whether a player character bound to breakthrough the center has been set. If not yet set, step ST153 searches for a midfielder or defender who is behind the ball. If no such a midfielder or defender is found, the processing proceeds to step ST155 which searches for a midfielder or defender near the ball. If no such a midfielder or defender is found, the processing proceeds to step ST157. If step ST151, ST153 or ST155 produces a positive answer, the processing proceeds to step ST157 which executes "CENTER BREAKTHROUGH MOTION" setting. The "CENTER BREAKTHROUGH MOTION" is set at a position which is determined in relation to the defense line of the counterpart team in the direction toward the goal and, in the transverse directions, at a random position. More specifically, when the ball is in front of the counterpart goal, the "CENTER BREAKTHROUGH MOTION" is set at a random position in the penalty area, otherwise, it is positioned so as to breakthrough the defense line of the counterpart team.

Figure 22:
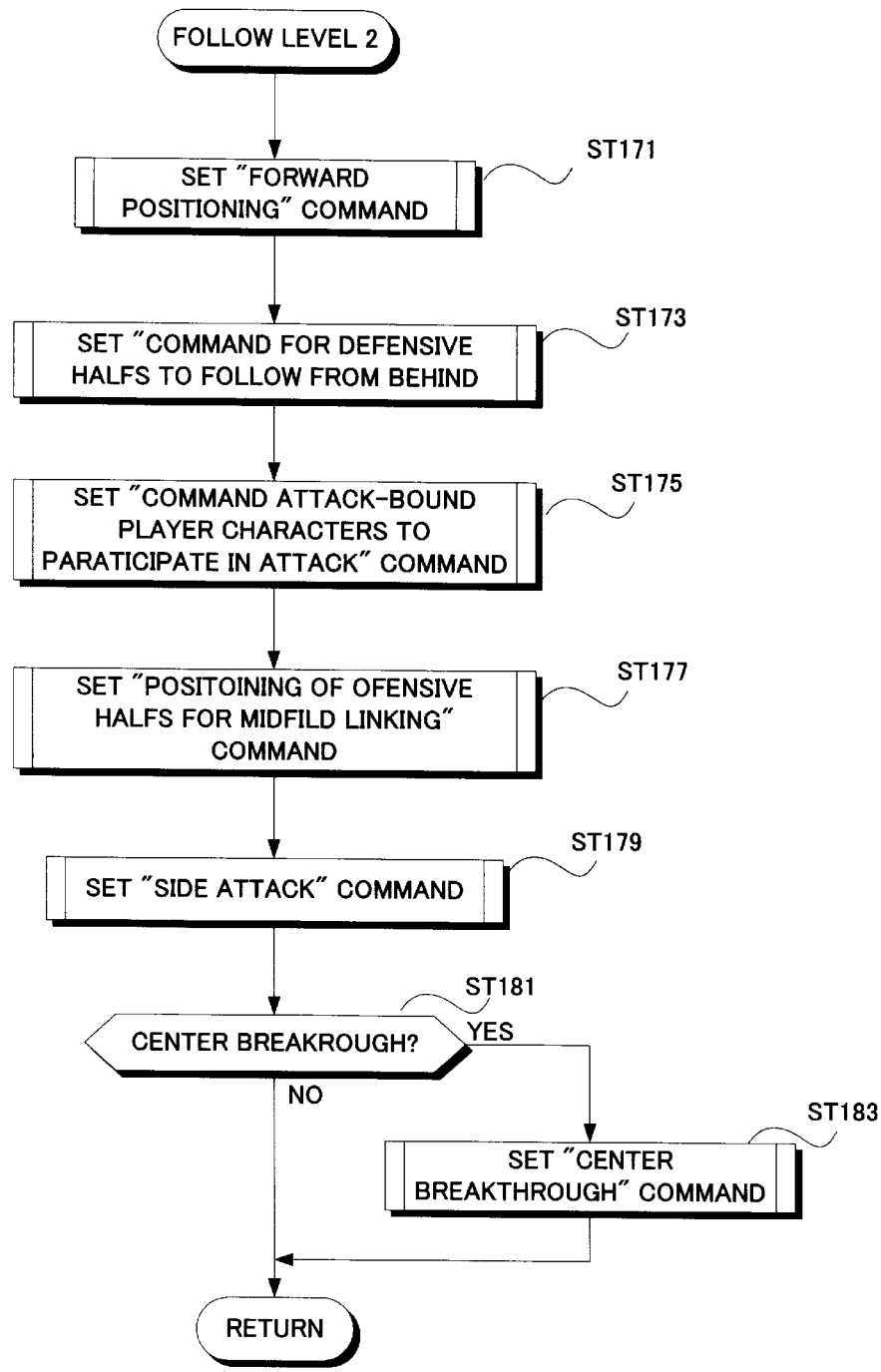
FIG. 22 is a flowchart showing a subroutine for "follow level 2" shown in FIG. 15.

FIG. 22 is a flowchart showing the subroutine for "follow level 2" shown in FIG. 15.

In the subroutine, a "forward positioning" command is first set at step ST171. Then, step ST173 sets a "command for defensive halves to follow from behind". In response to this command, the positions of the defensive halfs are set at basic defensive half positions and then moved progressively to approach the goal according to the position of the ball.

Then, step ST175 executes setting of a "commanding attack-bound player characters to participate in attack" command. In response to this command, the positions of the player characters bound for attacking are set in relation to the defense line of the counterpart team in the direction toward the goal, while set randomly in the transverse directions. More specifically, if the ball is in front of the counterpart goal, the positions of the player characters are set randomly in the penalty area, otherwise, the player characters are set at positions rather retracted from the frontier.

Referring back to FIG. 22, a "positioning of offensive halfs for midfield linking" command is set at step ST177, then setting of a "SIDE ATTACK" command is carried out at step ST179.

Subsequently, step ST181 determines whether the strategy is "CENTER BREAKTHROUGH". If positive, the "CENTER BREAKTHROUGH" command setting shown in FIG. 21 is executed at step ST183.

Figure 23:
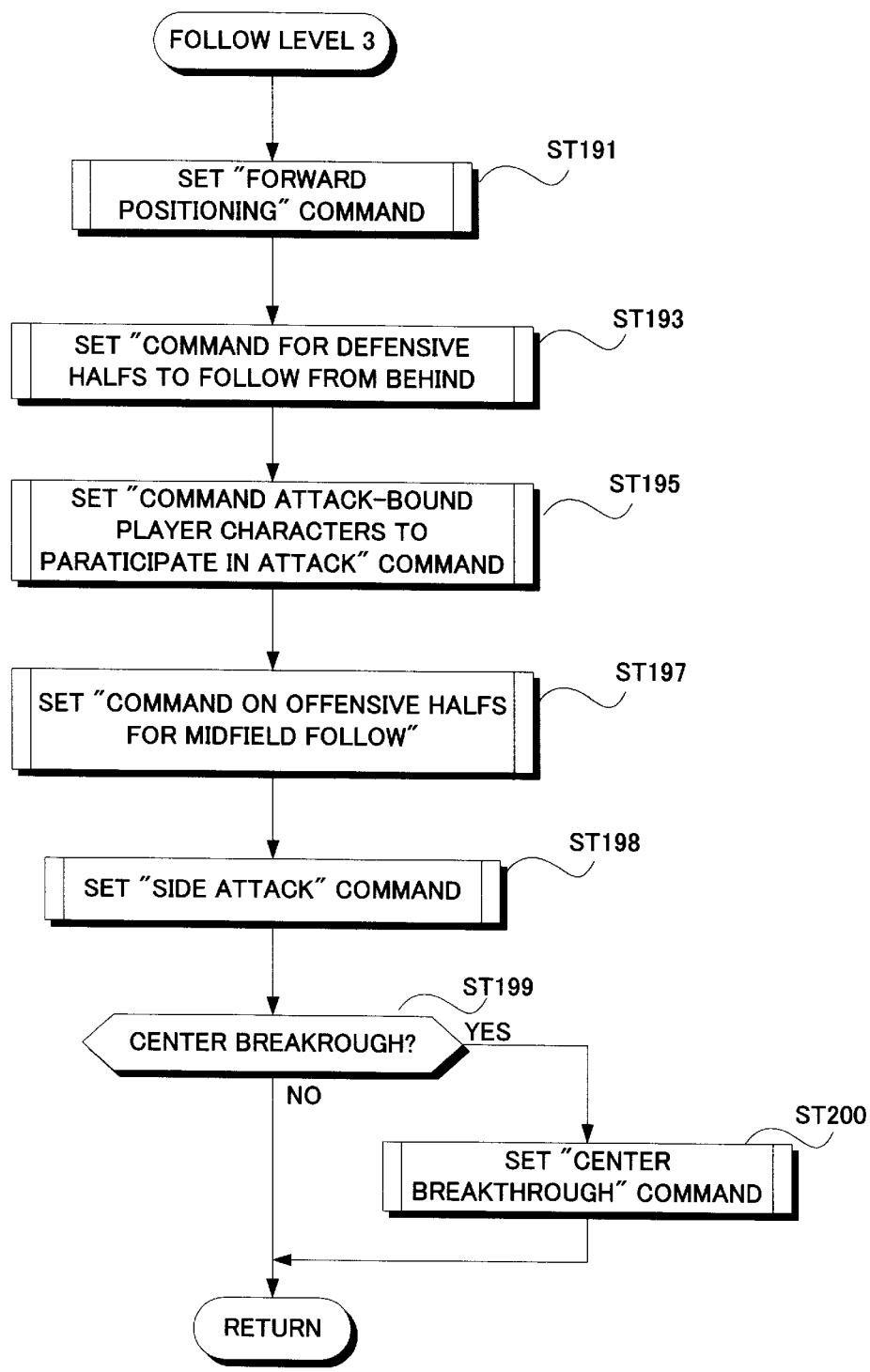
FIG. 23 is a flowchart showing a subroutine for "follow level 3" shown in FIG. 15.

FIG. 23 is a flowchart showing the subroutine for "follow level 3" shown in FIG. 15.

A "forward positioning" command is first set at step ST191, then a "command for defensive halfs to follow from behind" is set at step ST193, and then a "commanding attack-bound player characters to participate in attack" command is set at step ST195, Subsequently, a "command on offensive halfs for midfield follow" is set at step ST197. In response to the setting of this command, positions of the offensive halfs are set in relation to the position of the ball and the position of the defense line of the counterpart team, and then set in the transverse directions according to the position of the ball.

Then, the "SIDE ATTACK" command setting shown in FIGS. 18 and 19 is executed at step ST198. Subsequently, step ST199 determines whether the strategy is "CENTER BREAKTHROUGH". If positive, the "CENTER BREAKTHROUGH" command setting shown in FIG. 21 is executed at step ST200.

In the foregoing preferred embodiment, when the stamina value becomes zero, the running speed of the corresponding player character is largely lowered. However, other abilities, such as "dash", "shooting" and "defense", may be largely lowered depending on the player characters. Further, various types of ability changes may be possible, wherein, for example, as the stamina value is reduced, some ability is rapidly lowered while another ability is gradually lowered. In addition, the ability value which directly changes according to values of the atmosphere parameters is not limited to the stamina value. It may be possible to directly change values of other abilities, such as "dash", "shooting" and "defense", according to values of the atmosphere parameters.

In the foregoing preferred embodiment, the stamina value is always reduced according to values of the atmosphere parameters. However, it may also be arranged that the stamina value is increased depending on values of the atmosphere parameters so that, for example, the stamina is recovered when the motion of the player character is small.

In the foregoing preferred embodiment, the change in stamina value is displayed using the bar graph. However, it may also be displayed by numerals, change in color, an exhausted attitude of the player character, motion of the player character which changes according to the stamina value, or the like.

Further, the foregoing ability value is not limited to that which is assigned to each of the player characters in the team. For instance, a volition index which represents the fighting spirit of the whole team and which is a coefficient to increase an ability value per player character may be evenly assigned to all the player characters in the team and may be changed according to values of the atmosphere parameters. Alternatively, a unity index which is a coefficient to increase the success rate of formation plays or cooperative plays, such as passes, among the player characters may be evenly assigned to all the player characters in the team and may be changed according to values of the atmosphere parameters. In either of the cases, one ability value is enough for representing all the player characters in the team.

The foregoing preferred embodiment deals with a ball game such as the soccer game. However, the present invention is also applicable to those competition games other than ball games, such as wrestling tag matches and judo team matches, and further, not only team plays but also one-to-one matches between player characters. The present invention is further applicable to not only such a type of games wherein game players directly operate motion of player characters, but also to another type of games wherein game players only implement setting of player characters, such as setting of entry members, setting of formation and setting of strategies in team matches, and setting of techniques and weapons in individual matches, and wherein computers perform operation controls upon competition based on those settings, i.e. the game players carry out roles of directors or commanders.

In the foregoing preferred embodiment, the temperature and the humidity of the field are used to represent the atmosphere. On the other hand, brightness which differs between daytime and nighttime, presence/absence of cheering, magnitude of cheering and the like may also be used to represent the atmosphere. Further, the atmosphere is not necessarily represented by consecutive numerical values, but may be represented by certain discrimination, such as light or dark in a binary fashion. Moreover, the atmosphere may be changed following progress of the game, i.e. with a lapse of time.

While the present invention has been described in terms of the preferred embodiment and the modifications thereof, the invention is not to be limited thereto, but can be embodied in various ways without departing from the principle of the invention as defined in the appended claims.

What is claimed is:

1. An image display game system comprising an operation input section, an arithmetic section and an image display section,
   wherein a plurality of player characters each assigned an ability value compete with each other on a field based on an operation inputted by a game player via said operation input section and a given algorithm so as to decide a winner of a game, each of said player characters influenced by the corresponding ability value and wherein progress of the game is displayed via said image display section, and
   wherein said arithmetic section comprises:
      an atmosphere setting section which sets an atmosphere of said field;
      an atmosphere display arithmetic section which displays, via said image display section, an image of the atmosphere set by said atmosphere setting section; and
      an ability value changing section which changes each of said ability values according to the atmosphere set by said atmosphere setting section.

2. The image display game system according to claim 1, wherein said arithmetic section further comprises a field setting section which sets as said field one of a plurality of fields, and wherein said atmosphere setting section sets the atmosphere corresponding to the field set by said field setting section.

3. The image display game system according to claim 2, wherein said field setting section sets a place and a time as said set field.

4. The image display game system according to claim 1, wherein said atmosphere display arithmetic section displays said atmosphere in the form of weather of said field via said image display section.

5. The image display game system according to claim 1, wherein said arithmetic section divides said player characters into a plurality of teams and calculates a game between the teams to decide a winner team of the game.

6. The image display game system according to claim 1, wherein said atmosphere setting section sets said atmosphere by setting a value of an atmosphere parameter.

7. The image display game system according to claim 6, wherein each of said ability values comprises a stamina value representing stamina of the corresponding player character, and wherein said ability value changing section reduces each of said stamina values at a speed which changes according to the value of said atmosphere parameter.

8. The image display game system according to claim 6, wherein said atmosphere parameter comprises a temperature parameter, and wherein said atmosphere display arithmetic section displays said atmosphere in the form of a temperature of said field.

9. The image display game system according to claim 8, wherein said ability value changing section reduces each of said stamina values more rapidly as the temperature represented by said temperature parameter increases.

10. The image display game system according to claim 6, wherein said atmosphere parameter comprises a humidity parameter, and wherein said atmosphere display arithmetic section displays said atmosphere in the form of a humidity of said field.

11. The image display game system according to claim 10, wherein said ability value changing section reduces each of said stamina values more rapidly as the humidity represented by said humidity parameter increases.

12. The image display game system according to claim 7, wherein when any of said stamina values becomes no greater than a given value, said arithmetic section largely lowers an ability of the corresponding player character.

13. The image display game system according to claim 6, wherein said atmosphere parameter comprises a temperature parameter, and wherein said atmosphere display arithmetic section displays said atmosphere in the form of a temperature of said field.

14. The image display game system according to claim 6, wherein said atmosphere parameter comprises a humidity parameter, and wherein said atmosphere display arithmetic section displays said atmosphere in the form of a humidity of said field.

15. In an image display game system comprising an operation input section, an arithmetic section and an image display section, wherein a plurality of player characters each assigned an ability value compete with each other on a field based on an operation inputted by a game player via said operation input section and a given algorithm so as to decide a winner of a game, each of said player characters influenced by the corresponding ability value and wherein progress of the game is displayed via said image display section, an image display method comprising the steps, as functions of said arithmetic section, of:

setting an atmosphere of said field;

causing said image display section to display an image of said atmosphere;

changing each of said ability values according to said atmosphere; and causing said image display section to display the progress of the game achieved by the player characters whose ability values have been changed.

16. The image display method according to claim 15, wherein one of a plurality of fields is set as said field, and wherein the atmosphere is set so as to correspond to said set field.

17. The image display method according to claim 16, wherein a place and a time are set as said set field.

18. The image display method according to claim 14, wherein said atmosphere is set in the form of weather of said field which is displayed via said image display section.

19. The image display method according to claim 15, wherein said player characters are divided into a plurality of teams and a game between the teams is computed to decide a winner team of the game.

20. The image display method according to claim 15, wherein said atmosphere is set by setting a value of an atmosphere parameter.

21. The image display method according to claim 20, wherein each of said ability values comprises a stamina value representing stamina of the corresponding player character, and wherein each of said stamina values is reduced at a speed which changes according to the value of said atmosphere parameter.

22. The image display method according to claim 21, wherein said atmosphere parameter comprises a temperature parameter, and wherein said atmosphere is displayed in the form of a temperature of said field.

23. The image display method according to claim 22, wherein each of said stamina values is reduced more rapidly as the temperature represented by said temperature parameter increases.

24. The image display method according to claim 20, wherein said atmosphere parameter comprises a humidity parameter, and wherein said atmosphere is displayed in the form of a humidity of said field.

25. The image display method according to claim 24, wherein each of said stamina values is reduced more rapidly as the humidity represented by said humidity parameter increases.

26. The image display method according to claim 21, wherein when any of said stamina values becomes no greater than a given value, an ability of the corresponding player character is largely lowered.

27. The image display method according to claim 20, wherein said atmosphere parameter comprises a temperature parameter, and wherein said atmosphere is displayed in the form of a temperature of said field.

28. The image display method according to claim 20, wherein said atmosphere parameter comprises a humidity parameter, and wherein said atmosphere is displayed in the form of a humidity of said field.

29. A storage medium storing a program which is executable by an arithmetic section of an image display game system having an operation input section and an image display section, said program allowing said arithmetic section to operate such that a plurality of player characters each assigned an ability value compete with each other on a field based on an operation inputted by a game player via said operation input section and a given algorithm so as to decide a winner of a game, each of said player characters influenced by the corresponding ability value and such that progress of the game is displayed via said image display section, said program further allowing said arithmetic section to execute the steps of:

setting an atmosphere of said field;

changing each of said ability values according to said atmosphere; and causing said image display section to display an image of said atmosphere.

30. The storage medium according to claim 29, wherein one of a plurality of fields is set as said field, and wherein the atmosphere is set so as to correspond to said set field.

31. The storage medium according to claim 30, wherein a place and a time are set as said set field.

32. The storage medium according to claim 29, wherein said atmosphere is set in the form of weather of said field which is displayed via said image display section.

33. The storage medium according to claim 29, wherein said player characters are divided into a plurality of teams and a game between the teams is computed to decide a winner team of the game.

34. The storage medium according to claim 29, wherein said atmosphere is set by setting a value of an atmosphere parameter.

35. The storage medium according to claim 34, wherein each of said ability values comprises a stamina value representing stamina of the corresponding player character, and wherein each of said stamina values is reduced at a speed which changes according to the value of said atmosphere parameter.

36. The storage medium according to claim 35, wherein said atmosphere parameter comprises a temperature parameter, and wherein said atmosphere is displayed in the form of a temperature of said field.

37. The storage medium according to claim 36, wherein each of said stamina values is reduced more rapidly as the temperature represented by said temperature parameter increases.

38. The storage medium according to claim 35, wherein said atmosphere parameter comprises a humidity parameter, and wherein said atmosphere is displayed in the form of a humidity of said field.

39. The storage medium according to claim 38, wherein each of said stamina values is reduced more rapidly as the humidity represented by said humidity parameter increases.

40. The storage medium according to claim 35, wherein when any of said stamina values becomes no greater than a given value, an ability of the corresponding player character is largely lowered.

41. The storage medium according to claim 34, wherein said atmosphere parameter comprises a temperature parameter, and wherein said atmosphere is displayed in the form of a temperature of said field.

42. The storage medium according to claim 34, wherein said atmosphere parameter comprises a humidity parameter, and wherein said atmosphere is displayed in the form of a humidity of said field.

\* \* \* \* \*

UNITED STATES PATENT AND TRADEMARK OFFICE
CERTIFICATE OF CORRECTION

PATENT NO. : 6,168,519 B1
DATED : January 2, 2001
INVENTOR(S) : Nakagawa et al.

It is certified that error appears in the above-identified patent and that said Letters Patent is hereby corrected as shown below:

On the face of the patent:

In the inventor section, line 1, "Kakogawa" should read -- Kakogawa-Shi --.
line 2, "Moriguchi" should read -- Moriguchi-Shi --.

In the Abstract section, line 3, "Is" should read -- is --.

Column 1, line 22, "oil" should read -- on --.
Column 14, line 33, after "the" (first occurrence), cancel ",".
Column 20, line 28, "6" should read -- 7 --.
Column 20, line 37, "6" should read -- 7 --.
Column 21, line 19, "14" should read -- 15 --.
Column 21, line 43, "20" should read -- 21 --.

Signed and Sealed this

Eighth Day of May, 2001

*Attest:*

NICHOLAS P. GODICI

*Attesting Officer*  *Acting Director of the United States Patent and Trademark Office*